United States Patent
Panchekha et al.

(10) Patent No.: US 12,205,173 B2
(45) Date of Patent: *Jan. 21, 2025

(54) SYSTEMS AND METHODS FOR DYNAMICALLY GENERATING PORTFOLIOS USING ENSEMBLE TECHNIQUES

(71) Applicant: Turing Technology Associates, Inc., White Salmon, WA (US)

(72) Inventors: Alexey Panchekha, White Salmon, WA (US); Vadim Fishman, White Salmon, WA (US)

(73) Assignee: Turing Technology Associates, Inc., White Salmon, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,423

(22) Filed: Oct. 18, 2023

(65) Prior Publication Data

US 2024/0127346 A1    Apr. 18, 2024

Related U.S. Application Data

(63) Continuation of application No. 16/451,814, filed on Jun. 25, 2019, now Pat. No. 11,842,403.

(60) Provisional application No. 62/793,438, filed on Jan. 17, 2019, provisional application No. 62/726,470, filed on Sep. 4, 2018, provisional application No. 62/689,414, filed on Jun. 25, 2018.

(51) Int. Cl.
*G06Q 40/06* (2012.01)
*G06N 20/20* (2019.01)

(52) U.S. Cl.
CPC ............. *G06Q 40/06* (2013.01); *G06N 20/20* (2019.01)

(58) Field of Classification Search
CPC .............................. G06Q 40/06; G06N 20/20
See application file for complete search history.

(56) References Cited

U.S. PATENT DOCUMENTS

2009/0006275 A1    1/2009  Takano et al.
2009/0198633 A1    8/2009  Howard et al.
(Continued)

OTHER PUBLICATIONS

[No Author Listed], Rebalancing. Investopedia. May 29, 2018. www.investopedia.com/terms/r/rebalancing.asp [last accessed Jan. 29, 2021], 2 pages.
(Continued)

*Primary Examiner* — Elda G Milef
(74) *Attorney, Agent, or Firm* — Wolf, Greenfield & Sacks, P.C.

(57) ABSTRACT

According to at least one aspect, data of a plurality of existing portfolios is accessed that each include time series data of securities and associated weights. At least two existing portfolios are associated with a reference portfolio comprising reference time series data of reference securities and associated reference weights. Portfolio data is determined for at least two existing portfolios by determining, for each of a plurality of securities, difference data based on a difference between the weight of the security for the existing portfolio at a specific time period and a reference weight of the security at the specific time period, and determining a ranking for each of the plurality of securities based on the difference data. An ensemble portfolio is determined, based on the portfolio data and using an ensemble technique, comprising new time series data indicative of a new set of securities and associated new weights.

20 Claims, 11 Drawing Sheets

(56) References Cited

U.S. PATENT DOCUMENTS

| | | |
|---|---|---|
| 2009/0271332 A1 | 10/2009 | Lo et al. |
| 2010/0169237 A1 | 7/2010 | Howard et al. |
| 2011/0272780 A1 | 11/2011 | Smeys et al. |
| 2012/0023006 A1 | 1/2012 | Roser et al. |
| 2012/0233089 A1 | 9/2012 | Calman et al. |
| 2016/0217366 A1 | 7/2016 | Li |
| 2018/0247374 A1 | 8/2018 | Li |

OTHER PUBLICATIONS

Garg, A Primer to Ensemble Learning—Bagging and Boosting. Analytics India Magazine. Feb. 19, 2018. https://analyticsindiamag.com/primer-ensemble-learning-bagging-boosting/ [last accessed Nov. 5, 2021], 8 pages.

Signh, A Comprehensive Guide to Ensemble Learning (with Python codes). Analytics Vidhya. Jun. 18, 2018. https://www.analyticsvidhya.com/blog/2018/06/comprehensive-guide-for-ensemble-models/ [last accessed May 25, 2022], 19 pages.

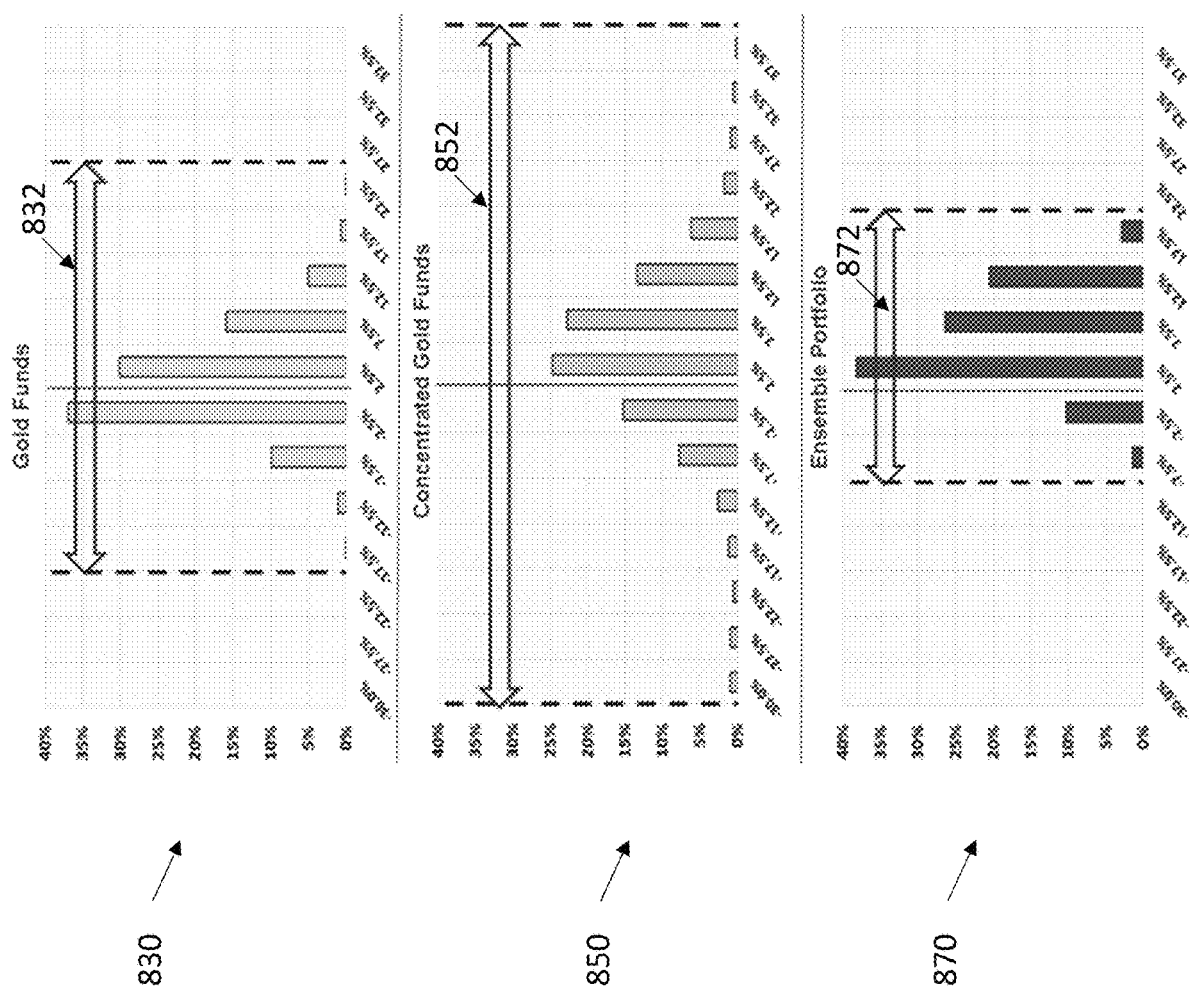

| | Average Excess Return (p.a.) | Tracking Err - Min | Tracking Err - Max | MIN Excess Return (p.a.) | 5TH PCTL | 95TH PCTL | MAX Excess Return (p.a.) |
|---|---|---|---|---|---|---|---|
| Gold Funds | 0.9% | 2.2% | 6.7% | -18.2% | -6.8% | 10.4% | 20.1% |
| Conc. Gold Funds | 4.2% | 2.8% | 11.5% | -29.6% | -10.4% | 18.5% | 37.1% |
| Ensemble Portfolio | 5.5% | | 4.3% | -6.2% | -3.2% | 13.0% | 16.9% |

SYSTEMS AND METHODS FOR DYNAMICALLY GENERATING PORTFOLIOS USING ENSEMBLE TECHNIQUES

CROSS-REFERENCE TO RELATED APPLICATIONS

This application is a continuation of U.S. patent application Ser. No. 16/451,814, filed Jun. 25, 2019, entitled "SYSTEMS AND METHODS FOR DYNAMICALLY GENERATING PORTFOLIOS USING ENSEMBLE TECHNIQUES," which claims the benefit under 35 U.S.C. § 119(e) of U.S. Provisional Application Ser. No. 62/793,438, filed Jan. 17, 2019, entitled "A METHOD AND SYSTEM FOR CREATING AN ENSEMBLE PORTFOLIO FROM UNDERLYING WEAK PREDICTIVE ENGINES," U.S. Application Ser. No. 62/726,470, filed Sep. 4, 2018, entitled "A METHOD AND SYSTEM FOR CREATING AN ENSEMBLE PORTFOLIO FROM UNDERLYING WEAK PREDICTIVE ENGINES," and U.S. Application Ser. No. 62/689,414, filed Jun. 25, 2018, entitled "A SYSTEM AND METHOD FOR CREATING AN ENSEMBLE PORTFOLIO FROM A SERIES OF UNDERLYING WEAK PREDICTIVE ENGINES," the entire contents of which are incorporated herein by reference in their entirety.

BACKGROUND

Investment portfolios typically include a composition of financial instruments (e.g. stocks, bonds, futures, ETFs, etc.) that may vary in time. In general, investment portfolios can be active portfolios or passive/index portfolios. Passive portfolios are typically designed to simply track an existing reference (e.g., reference portfolio, index or benchmark) without incorporating any predictive elements designed to provide some performance advantage over the reference. Active portfolios are typically designed to outperform a reference, once factoring in any fees. Unlike passive portfolios, active portfolios incorporate predictive elements.

For decades, active portfolios that are professionally managed typically include: an individual portfolio manager and/or a portfolio management team; a distinct investment philosophy (e.g., reflecting the guiding principles that inform and define the manager's investment decision-making process and their predictive elements in the portfolio); aspects, such as 1) the type and manner in which quantitative and/or qualitative information is evaluated, 2) the decision-making process used in order to construct a dynamic pool of securities, with correspondingly dynamic portfolio weights, and 3) other components that are incorporated as core aspects of the predictive process (e.g., collectively, often also referred to as a predictive engine); an intent to outperform or create value over time relative to its benchmark or competitive peer group (e.g., superior risk-adjusted returns); and a policy whereby portfolio holdings and portfolio weights are traditionally kept confidential on a real-time basis and only disclosed to meet industry or regulatory requirements (e.g., quarterly disclosures that are issued with a one-month lag). The predictive elements/predictive engine can include predictive insights of any nature. For example, the predictive elements can be in the form of an algorithm, strategy, methodology, process, intellectual view, experience, manager, or management team that are used to outperform a reference.

In order for an active portfolio to have an opportunity to outperform its benchmark, an active portfolio is constructed to have tangible differences compared to the benchmark. Such differences can be reflected through a unique selection of securities that differs from the benchmark, and/or through security weights within the portfolio that differ from the benchmark. It is typically common in the industry for each manager to use their own philosophy, methodology and/or process to create a proprietary predictive engine to drive a series of discrete portfolio decisions. Such decisions can include, for example: which securities to include in the portfolio, and which of the available securities to exclude; which securities have the highest predictive or anticipated potential of outperformance (e.g., and thus merit the highest portfolio allocations and portfolio over-weights versus the benchmark); when to purchase a new security, or when to add to an existing security's allocation; and/or when to sell an existing security, or when to trim back an existing security's allocation.

Since each portfolio is typically defined by a single manager (or management team) with a singular investment strategy and philosophy, it will typically result in non-diversified biases being embedded into the portfolio. Non-diversified biases can create the potential for unacceptably large potentials for significant relative underperformance versus the benchmark, which can also be referred to as a tail event. Because significant tail events can materially impair an end-investor from achieving their investment goals, the investment industry has adapted a nearly universal approach to reduce the potential risk of an investment generating a large negative tail event. This approach is to add large numbers of securities that function primarily in a risk-management role and are used to dampen distribution tails. These added securities, and their corresponding portfolio weights, are often referred to as beta anchors. It is not uncommon for a beta anchor of a portfolio to equal ⅔ or ¾ of the entire portfolio weight. By intent, and supported by research, the beta anchors are not designed to increase expected investment return. Because of this fact, beta anchors incur a performance penalty on the investment portfolio by diluting the potential returns of the predictive engine. Therefore, while beta anchors can help prevent large negative tail events, beta anchors can also create a significant performance penalty as a side effect of the desired risk management function.

SUMMARY

According to at least one aspect, a method is provided that uses at least one computer hardware processor. The method includes accessing data indicative of a plurality of existing portfolios, wherein each of the plurality of existing portfolios comprises time series data indicative of a set of securities and associated weights, and at least two existing portfolios of the plurality of existing portfolios are each associated with a reference portfolio comprising reference time series data indicative of a reference set of securities and associated reference weights. The method includes determining portfolio data for each of the at least two existing portfolios at least in part by determining, for each of a plurality of securities in the set of securities, difference data based on a difference between the weight of the security for the existing portfolio at a specific time period and a reference weight of the security for the reference portfolio at the specific time period, and determining a ranking for each of the plurality of securities based on the difference data of each security. The method includes determining, based on the portfolio data and using an ensemble technique, an ensemble portfolio comprising new time series data indicative of a new set of securities and associated new weights.

In some embodiments, accessing data indicative of the plurality of existing portfolios includes, for at least one portfolio of the plurality of existing portfolios, replicating the set of securities and associated weights of the existing portfolio using public data associated with the existing portfolio.

In some embodiments, accessing data indicative of the plurality of existing portfolios comprises, for at least one portfolio of the plurality of existing portfolios: obtaining the data through direct ownership of the data; obtaining the data from an owner of the data; obtaining the data by purchasing the data from a public source, or some combination thereof.

In some embodiments, the second data for each of the plurality of securities comprises data indicative of a manager's likely conviction level for each associated security compared to the remaining securities of the plurality of securities.

In some embodiments, the method further includes determining the portfolio data for a time series, wherein the time series includes a plurality of time periods, comprising determining the difference data for each of the plurality of time periods.

In some embodiments, determining the portfolio data for at least one portfolio of the plurality of portfolios includes determining, for each security of a subset of securities of the plurality of securities, a speed of change of the security, the weight of the security, or both, based on the reference portfolio, a scale of change of the security, the weight of the security, or both, compared to the reference portfolio, and determining a ranking for each security of the subset of securities based on the determined speed, scale, or both.

In some embodiments, determining the portfolio data for at least one portfolio of the plurality of portfolios includes determining, for each security of a subset of securities of the plurality of securities, a speed of change of the security, the weight of the security, or both, over time, a scale of change of the security, the weight of the security, or both, over time, and determining a ranking for each security of the subset of securities based on the determined speed, scale, or both.

In some embodiments, determining the ensemble portfolio using the ensemble technique comprises determining the new time series data using a pro rata ensemble technique, comprising averaging the set of securities and associated weights for each of the plurality of existing portfolios on a pro rata basis to create the new time series data of the ensemble portfolio.

In some embodiments, the method includes generating a subset of the new set of securities, modifying the associated new weights, or both, comprising one or more of: selecting the subset of the new set of securities based on a ranking associated with each security in the new set of securities determined using the ensemble technique; determining one or more securities in the subset of securities by determining the one or more securities are also included in a secondary reference portfolio; and selecting the subset of the new set of securities based on a determined investment characteristic of each of the securities in the new set of securities, wherein the determined investment characteristic comprises one or more of: volatility of the security; dividend yield of the security; market capitalization of the security; and correlation of the security to a secondary reference portfolio.

In some embodiments, the method includes generating an investor portfolio based on the ensemble portfolio, comprising adding at least a portion of the new set of securities and associated new weights to the investor portfolio, determining the investor portfolio has an expected relative performance distribution range greater than a desired distribution range, determining one or more additional securities, wherein each of the one or more additional securities has a correlation to an associated reference portfolio that meets a correlation threshold, and adding the one or more additional securities to the investor portfolio.

In some embodiments, the method includes generating an investor portfolio based on the ensemble portfolio, comprising adding leverage to at least a portion of the ensemble portfolio, de-leveraging at least a portion of the ensemble portfolio, or both, and adding a new set of securities and associated new weights to the ensemble portfolio to modify a determined investment characteristic of the investor portfolio, wherein the determined investment characteristic comprises one or more of volatility of the investor portfolio, dividend yield of the investor portfolio, market capitalization of the investor portfolio, and correlation of the investor portfolio to a secondary reference portfolio.

In some embodiments, the method includes generating an investment portfolio based on the ensemble portfolio without modifying the new set of securities and associated new weights.

According to at least one aspect, a system is provided. The system includes at least one hardware processor and at least one non-transitory computer-readable storage medium storing processor-executable instructions that, when executed by the at least one hardware processor, cause the at least one hardware processor to access data indicative of a plurality of existing portfolios, wherein each of the plurality of existing portfolios comprises time series data indicative of a set of securities and associated weights, and at least two existing portfolios of the plurality of existing portfolios are each associated with a reference portfolio comprising reference time series data indicative of a reference set of securities and associated reference weights. The instructions cause the at least one processor to determine portfolio data for each of the at least two existing portfolios at least in part by determining, for each of a plurality of securities in the set of securities, difference data based on a difference between the weight of the security for the existing portfolio at a specific time period and a reference weight of the security for the reference portfolio at the specific time period, and determining a ranking for each of the plurality of securities based on the difference data of each security. The instructions cause the at least one processor to determine, based on the portfolio data and using an ensemble technique, an ensemble portfolio comprising new time series data indicative of a new set of securities and associated new weights.

In some embodiments, accessing data indicative of the plurality of existing portfolios comprises, for at least one portfolio of the plurality of existing portfolios, replicating the set of securities and associated weights of the existing portfolio using public data associated with the existing portfolio.

In some embodiments, accessing data indicative of the plurality of existing portfolios comprises, for at least one portfolio of the plurality of existing portfolios: obtaining the data through direct ownership of the data; obtaining the data from an owner of the data; obtaining the data by purchasing the data from a public source, or some combination thereof.

In some embodiments, the second data for each of the plurality of securities comprises data indicative of a manager's likely conviction level for each associated security compared to the remaining securities of the plurality of securities.

In some embodiments, the instructions further cause the at least one hardware processor to determine the portfolio data for a time series, wherein the time series includes a plurality of time periods, comprising determining the difference data for each of the plurality of time periods.

In some embodiments, determining the portfolio data for at least one portfolio of the plurality of portfolios comprises determining, for each security of a subset of securities of the plurality of securities, a speed of change of the security, the weight of the security, or both, based on the reference portfolio, a scale of change of the security, the weight of the security, or both, compared to the reference portfolio, and determining a ranking for each security of the subset of securities based on the determined speed, scale, or both.

In some embodiments, determining the portfolio data for at least one portfolio of the plurality of portfolios comprises determining, for each security of a subset of securities of the plurality of securities, a speed of change of the security, the weight of the security, or both, over time, a scale of change of the security, the weight of the security, or both, over time, and determining a ranking for each security of the subset of securities based on the determined speed, scale, or both.

In some embodiments, determining the ensemble portfolio using the ensemble technique comprises determining the new time series data using a pro rata ensemble technique, comprising averaging the set of securities and associated weights for each of the plurality of existing portfolios on a pro rata basis to create the new time series data of the ensemble portfolio.

In some embodiments, the instructions further cause the at least one hardware processor to generate a subset of the new set of securities, modifying the associated new weights, or both, comprising one or more of: selecting the subset of the new set of securities based on a ranking associated with each security in the new set of securities determined using the ensemble technique; determining one or more securities in the subset of securities by determining the one or more securities are also included in a secondary reference portfolio; selecting the subset of the new set of securities based on a determined investment characteristic of each of the securities in the new set of securities, wherein the determined investment characteristic comprises one or more of: volatility of the security; dividend yield of the security; market capitalization of the security; and correlation of the security to a secondary reference portfolio.

In some embodiments, the instructions further cause the at least one hardware processor to generate an investor portfolio based on the ensemble portfolio, comprising adding at least a portion of the new set of securities and associated new weights to the investor portfolio, determining the investor portfolio has an expected relative performance distribution range greater than a desired distribution range, determining one or more additional securities, wherein each of the one or more additional securities has a correlation to an associated reference portfolio that meets a correlation threshold, and adding the one or more additional securities to the investor portfolio.

In some embodiments, the instructions further cause the at least one hardware processor to generate an investor portfolio based on the ensemble portfolio, comprising adding leverage to at least a portion of the ensemble portfolio, de-leveraging at least a portion of the ensemble portfolio, or both, and adding a new set of securities and associated new weights to the ensemble portfolio to modify a determined investment characteristic of the investor portfolio, wherein the determined investment characteristic comprises one or more of volatility of the investor portfolio, dividend yield of the investor portfolio, market capitalization of the investor portfolio, and correlation of the investor portfolio to a secondary reference portfolio.

In some embodiments, the instructions further cause the at least one hardware processor to generate an investment portfolio based on the ensemble portfolio without modifying the new set of securities and associated new weights.

According to at least one aspect, at least one computer readable storage medium is provided. The computer readable storage medium stores processor-executable instructions that, when executed by at least one processor, cause the at least one processor to perform accessing data indicative of a plurality of existing portfolios, wherein each of the plurality of existing portfolios comprises time series data indicative of a set of securities and associated weights, and at least two existing portfolios of the plurality of existing portfolios are each associated with a reference portfolio comprising reference time series data indicative of a reference set of securities and associated reference weights. The instructions cause the at least one processor to determine portfolio data for each of the at least two existing portfolios at least in part by determining, for each of a plurality of securities in the set of securities, difference data based on a difference between the weight of the security for the existing portfolio at a specific time period and a reference weight of the security for the reference portfolio at the specific time period, and determining a ranking for each of the plurality of securities based on the difference data of each security. The instructions cause the at least one processor to determine, based on the portfolio data and using an ensemble technique, an ensemble portfolio comprising new time series data indicative of a new set of securities and associated new weights.

According to at least one aspect, a method is provided that uses at least one computer hardware processor to perform the method. The method includes accessing data for at least first and second existing portfolios, each of the first and second portfolios being associated with a reference portfolio comprising reference time series data for a reference set of securities and associated reference weights, the accessing comprising accessing first data for the first existing portfolio, the first data comprising first time series data indicative of a first set of securities and associated first weights, and accessing second data for the second existing portfolio, the second data comprising second time series data indicative of a second set of securities and associated second weights. The method includes ranking each of the first set of securities based on a comparison of the first weights and the reference weights to obtain a first set of rankings. The method includes ranking each of the second set of securities based on a comparison of the second weights and the reference weights to obtain a second set of rankings. The method includes determining, using an ensemble technique and the first and second sets of rankings, an ensemble portfolio comprising new time series data indicative of a new set of securities and associated new weights, wherein the new set of securities includes securities selected from among the first set of securities, the second set of securities, or both.

In some embodiments, the method includes accessing third data for a third existing portfolio, the third data comprising third time series data indicative of a third set of securities and associated third weights, ranking each of the third set of securities, and determining, using the ensemble technique and the first, second and third sets of rankings, the ensemble portfolio.

In some embodiments, determining the ensemble portfolio using the ensemble technique comprises determining the new time series data using a pro rata ensemble technique, comprising averaging the first set of securities and associated first weights and second set of securities and associated second weights on a pro rata basis to create the new time series data of the ensemble portfolio.

According to at least one aspect, a system is provided. The system includes at least one hardware processor and at least one non-transitory computer-readable storage medium storing processor-executable instructions that, when executed by the at least one hardware processor, cause the at least one hardware processor to perform accessing data for at least first and second existing portfolios, each of the first and second portfolios being associated with a reference portfolio comprising reference time series data for a reference set of securities and associated reference weights, the accessing comprising accessing first data for the first existing portfolio, the first data comprising first time series data indicative of a first set of securities and associated first weights, and accessing second data for the second existing portfolio, the second data comprising second time series data indicative of a second set of securities and associated second weights. The instructions cause the at least one processor to rank each of the first set of securities based on a comparison of the first weights and the reference weights to obtain a first set of rankings. The instructions cause the at least one processor to rank each of the second set of securities based on a comparison of the second weights and the reference weights to obtain a second set of rankings. The instructions cause the at least one processor to determine, using an ensemble technique and the first and second sets of rankings, an ensemble portfolio comprising new time series data indicative of a new set of securities and associated new weights, wherein the new set of securities includes securities selected from among the first set of securities, the second set of securities, or both.

According to at least one aspect, at least one computer readable storage medium is provided. The computer readable storage medium stores processor-executable instructions that, when executed by at least one processor, cause the at least one processor to perform accessing data for at least first and second existing portfolios, each of the first and second portfolios being associated with a reference portfolio comprising reference time series data for a reference set of securities and associated reference weights, the accessing comprising accessing first data for the first existing portfolio, the first data comprising first time series data indicative of a first set of securities and associated first weights, and accessing second data for the second existing portfolio, the second data comprising second time series data indicative of a second set of securities and associated second weights. The instructions cause the at least one processor to rank each of the first set of securities based on a comparison of the first weights and the reference weights to obtain a first set of rankings. The instructions cause the at least one processor to rank each of the second set of securities based on a comparison of the second weights and the reference weights to obtain a second set of rankings. The instructions cause the at least one processor to determine, using an ensemble technique and the first and second sets of rankings, an ensemble portfolio comprising new time series data indicative of a new set of securities and associated new weights, wherein the new set of securities includes securities selected from among the first set of securities, the second set of securities, or both.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 8B includes three graphs of rolling one-year periods that compare large-cap Gold-rated funds, corresponding concentrated portfolios of each Gold-rated fund, and an EAM portfolio built from the large-cap Gold-rated funds, according to some embodiments of the technology described herein.

FIG. 8C is a table showing Gold-rated funds, corresponding concentrated portfolios for each Gold-rated fund, and resulting EAM portfolio results, according to some embodiments of the technology described herein.

DETAILED DESCRIPTION

Figure 1:
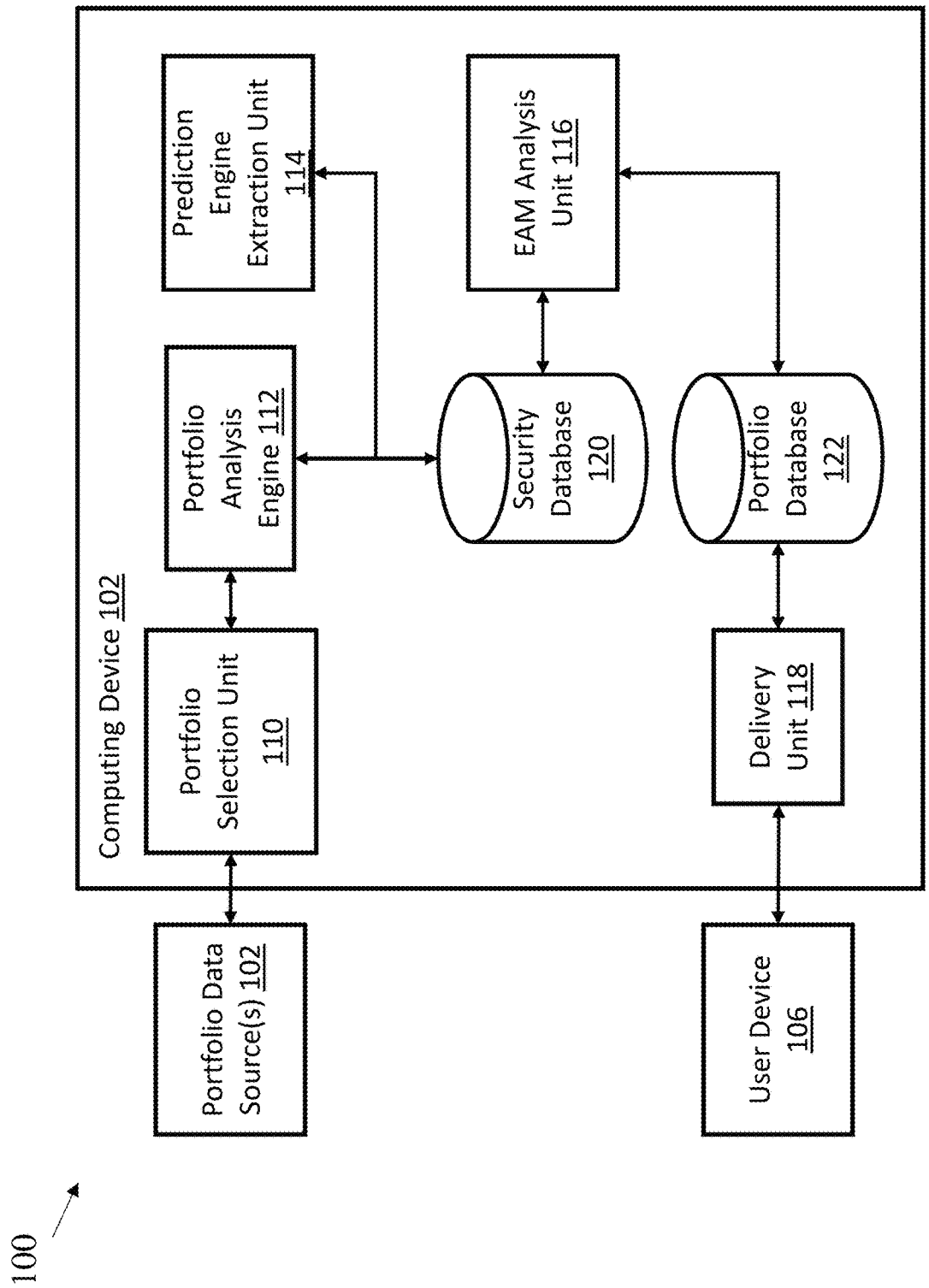
FIG. 1 is a diagram showing an exemplary portfolio generation system, according to some embodiments of the technology described herein.

The inventors have recognized numerous deficiencies with conventional active management techniques. For the investment management industry, there are two competing business goals: maximizing the average or expected returns over the benchmark, while limiting the potential of negative tail events. However, the inventors have recognized that traditional active investment management techniques that attempt to address both of these goals simultaneously routinely deliver subpar results.

One problem with conventional active portfolio strategies is that each portfolio is typically defined by a single manager or team with a singular investment strategy and philosophy, which results in non-diversified biases embedded into the portfolio. Such non-diversified biases create the potential for unacceptably large relative performance distribution tails. For example, if a portfolio is over-weighted towards the tech-sector based on a manager's view that technology is the best long-term driver of return, and if the tech sector then goes through an extended correction period, it will be hard, if not impossible, for the portfolio to outperform the market compared to more diversified portfolios. Even when using management teams, if the portfolio still maintains a singular investment strategy/philosophy/approach, then the portfolio will still be subject to non-diversified biases, and thus the potential for large distribution tails.

Another problem with conventional active portfolio strategies is that investment strategies are not measured over a single, discrete time period, but instead over rolling time periods. This creates a distribution of period-specific returns for a single investment portfolio, and the portfolio manager is accountable for the scale of the range of return distributions. As described herein, investment strategies that have the potential for large negative tail events are typically considered unacceptable for most commercial uses due to the potential for serious harm to investors. As described herein, beta anchors are typically used to reduce the risk of such outcomes. As a result, conventional investment portfolios have two components: a) the portion built from securities selected with the intent to outperform the benchmark, and b) the portion intended to reduce the likelihood and severity of excessive relative performance distribution tails, or the beta anchor. For ease of explanation, and without intending to limit the subject matter described herein, the portion of the portfolio selected to outperform the benchmark can be referred to as the alpha engine, or the output of the predictive engine. Since the beta anchor is traditionally not designed to add to outperformance, and can represent up to ¾ of the overall portfolio, it can have a significant dilutive impact on the returns of the alpha engine portion of the portfolio. After the dilution effect, the resulting residual performance is further reduced by the impact of fees.

Another problem with conventional active portfolio strategies is that to reduce distribution tails, and to stabilize expected returns, the industry may build an investment portfolio from multiple independent investment portfolios (e.g., invest in several large capitalization US equity mutual funds). While this strategy can further reduce distribution tails due to the added diversification, because each of the independent investment portfolios includes a built-in beta anchor, the final portfolio will still typically have a beta anchor of about 60%-75%. Therefore, the inventors have recognized that the dilution impact of beta anchors cannot be traditionally mitigated by building an investment portfolio from other portfolios.

Accordingly, the inventors have conceived and developed new technology to construct investment portfolios that improves upon the various problems and deficiencies with conventional portfolio management techniques. This new technology, which is a computer-related technology, includes techniques to generate an improved, dynamic investment portfolio that outperforms traditional managed active portfolios while still providing appropriate risk management versus the risk of significant relative performance distribution tails. The technology described herein constitutes an improvement to computer-related financial portfolio generation and management technology.

In some embodiments, the techniques include computerized techniques to build a dynamic and up-to-date database of securities and portfolio weights of multiple actively managed investment portfolios. As described herein, the holdings and weights of an actively managed investment portfolio are the result of a manager's predictive decision making. The techniques can include using data mining techniques to extract the securities and/or weights of each portfolio over time. In some embodiments, the techniques include computerized techniques to serially extract the (often hidden) high conviction predictive security selections representative of the alpha engine from the underlying portfolio data. The techniques can include comparing the portfolio security holdings and/or weights to the benchmark to determine deviations in holdings and/or weights that are indicative of the alpha engine. The techniques can include determining data indicative of likely levels of manager conviction for each of the securities in the portfolio. Since the integrity of the security holdings, weights, and convictions can degrade rapidly over time, the techniques can be configured to periodically analyze relevant data to maintain the timeliness of the security and weighting data in the database.

In some embodiments, the techniques include computerized techniques, including ensemble method or ensemble learning techniques, that combine the series of extracted sets of high conviction predictive securities into a single portfolio. Using ensemble methods techniques can combine the securities in a manner that improves the accuracy of independent predictive models (each associated with a respective portfolio) by creating a multi-expert predictive engine which is informed by agreement between the underlying predictive models. The ensemble methods techniques can incorporate data indicative of the determined conviction level of the underlying managers' security selection. Incorporating conviction data can improve the ensemble portfolio due to the fact that, as noted above, there is a decay curve to the predictive accuracy of an individual manager's security selections related to their level of conviction for that selection (e.g., such that the greater the conviction level, the higher the expected predictive accuracy). The ensemble methods process generates a series of updated portfolios of securities and weights that exhibit superior security selection predictive accuracy. For ease of explanation, the resulting portfolio is referred to as an Ensemble Active Management (EAM) portfolio. When used to manage a new dynamic investment portfolio, the updated securities and weights of the EAM portfolio deliver higher expected median/average returns with acceptable level of distribution tails when compared to traditional managed active portfolios with beta anchors.

In some embodiments, the techniques include delivering the resulting top ranked set of securities through an investment portfolio where the beta anchor is either excluded, or set to the minimum allocation sufficient to avoid unacceptable negative distribution tails. The resulting dynamic EAM portfolio, which is based on implementing a series of periodic output portfolios, will exhibit improved tail risk management characteristics due to the benefit of the natural diversification of the unique biases that each of the underlying investment portfolios (e.g., output of the predictive models) generate. The resulting diversified suite of biases in the output portfolio will have a reduced scale of the distribution tails, reducing the potential for large negative tails.

The techniques described herein can therefore enhance the statistical expectations of return while simultaneously generating a tail risk management benefit that does not carry a performance penalty to would impair expected returns like traditional beta anchors. In some embodiments, up to ⅔ to ¾ of the expected improved performance results can be attributed to the elimination or reduction of the beta anchor (and its dilutive performance penalty). The EAM portfolio enables such benefits due to the fact that the model takes into account multiple predictive engines (e.g., and thus can be considered a multi-expert model, in a sense) where the process-level diversification can be used to manage tail risk, based on the fact that the ensemble methods techniques diversify the unique suite of biases that single-expert predictive models otherwise exhibit, and/or the like.

The techniques described herein, including those reflecting the multi-expert design elements achieved by combining the individual predictive engines of separate portfolios through ensemble techniques, run counter to the industry's standard practice of delivering active portfolios reflecting 1) a single manager/management team, 2) singular investment philosophy, and/or 3) singular investment process/methodology.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

FIG. 1 is an exemplary diagram of a computerized system 100 for determining a dynamic portfolio, according to some embodiments of the technology described herein. The system 100 includes a computing device 102 that is in communication with one or more portfolio data sources 104 and one or more user devices 106. The computing device 102 includes one or more processors and memory configured to store computerized instructions configured to cause the one or more processors to perform the techniques described herein. The computing device 102 includes a portfolio selection unit 110 in communication with the portfolio data sources 102 and a portfolio analysis engine 112. The computing device 102 also includes a prediction engine extraction unit 114, an EAM analysis unit 116, and a delivery unit 118. The computing device 102 also includes a security database 120 and a portfolio database 122. The portfolio analysis engine 112, prediction engine extraction unit 114, and the EAM analysis unit 116 are in communication with the security database 120. The EAM analysis unit 116 and the delivery unit 118 are in communication with the portfolio database 122.

The portfolio data sources 102 can include data on investment portfolios and/or other relevant information. For example, as discussed in conjunction with FIGS. 3-5, the data can include, for example, fund prices/returns, stock prices, returns, holdings reports, relevant corporate actions, and/or the like.

The portfolio selection unit 110 selects portfolios to process using the techniques described herein. In some embodiments, as described in conjunction with step 202 of FIG. 2, the portfolio selection unit 110 can select portfolios that share one or more common metrics, such as portfolios that share a common benchmark or reference.

The portfolio analysis engine 112 builds a dynamic and up-to-date database 120 of securities and portfolio weights of the multiple actively managed investment portfolios selected by the portfolio selection unit. The techniques implemented by the portfolio analysis engine 112 are described further herein, including in conjunction with FIGS. 2-5.

The prediction engine extraction unit 114 uses the data in the security database 120 to extract the high conviction predictive security selections (or output of the predictive engine) for each portfolio from the underlying portfolio data. The techniques implemented by the portfolio analysis engine 112 are described further herein, including in conjunction with FIGS. 2-5.

The EAM analysis unit 116 uses ensemble methods techniques to combine the series of extracted sets of high conviction predictive securities, using the data in the security database 120, into a single dynamic portfolio that is based on implementing a series of periodic portfolios, which is stored in the portfolio database 112. The techniques implemented by the EAM analysis unit 116 are described further herein, including in conjunction with FIGS. 2 and 7. The delivery unit 118 determines a portfolio structure used to deliver the resulting top ranked set of securities through an investment portfolio where the beta anchor is either excluded or set to a minimum.

Figure 2:
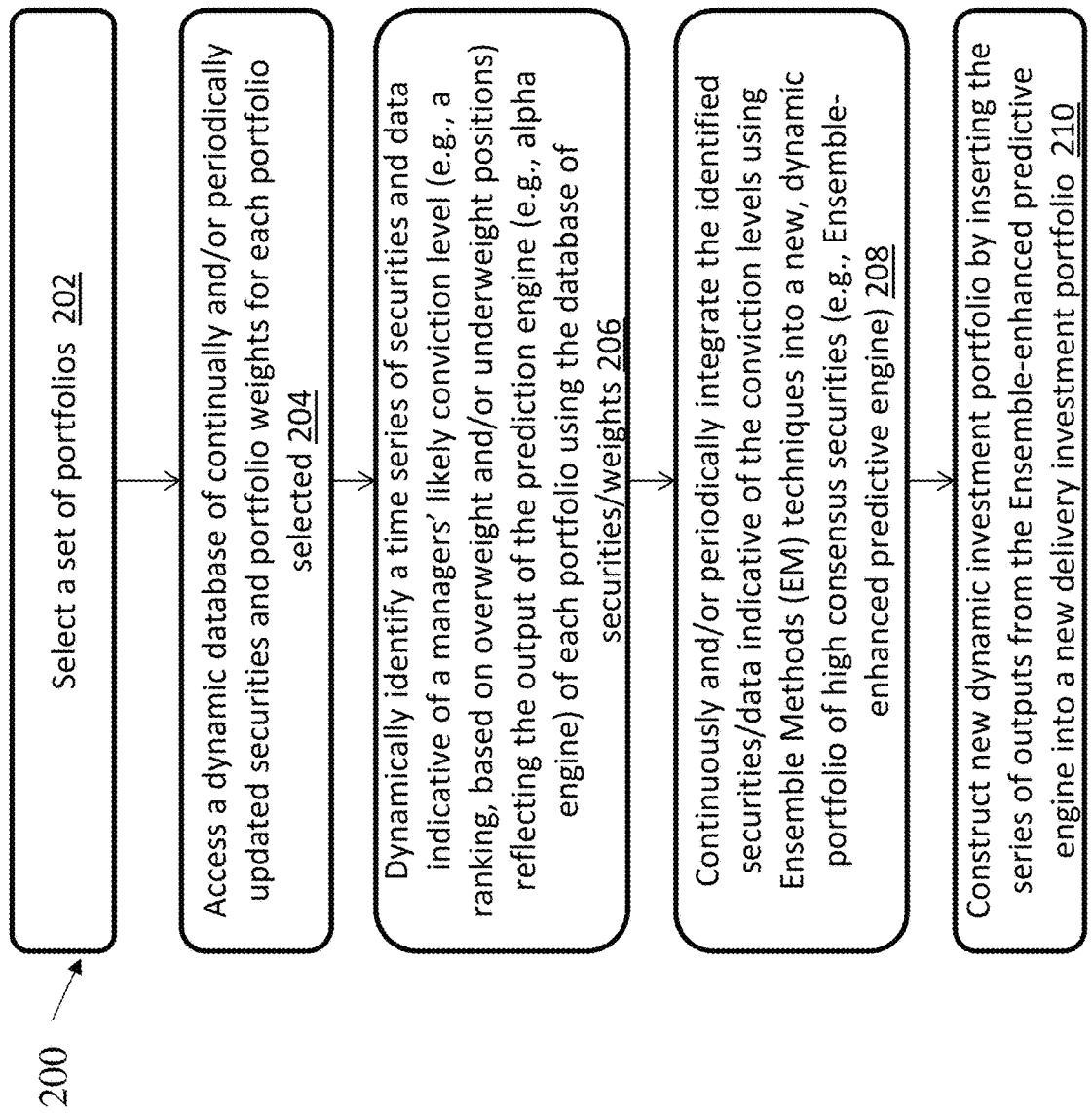
FIG. 2 is an exemplary computerized method for generating a dynamic portfolio based on the underlying portfolio information of a set of related portfolios, according to some embodiments of the technology described herein.

FIG. 2 is an exemplary computerized method 200 for generating a dynamic portfolio based on the underlying portfolio information of a set of related portfolios, according to some embodiments of the technology described herein. The method 200 can be implemented by, for example, the computing device 102 discussed in conjunction with FIG. 1. At step 202, the computing device (e.g., via portfolio selection unit 110 in FIG. 1) selects a set of portfolios. At step 204, the computing device (e.g., via the portfolio analysis engine 112 in FIG. 1) builds a dynamic database of continually and/or periodically updated securities and portfolio weights for each portfolio selected. At step 206, the computing device (e.g., via the prediction engine extraction unit 114 in FIG. 1) dynamically extracts securities and data indicative of a manager's likely conviction level (e.g., by ranking overweight and/or underweight positions of the extracted securities), reflecting the output of the prediction engine (e.g., alpha engine) of each portfolio using the database of securities/weights (e.g., the security database 120 in FIG. 1). At step 208, the computing device (e.g., via the EAM analysis unit 116 in FIG. 1) continuously and/or periodically combines the extracted securities/conviction levels using Ensemble Methods (EM) techniques into a new, dynamic portfolio of high consensus securities (e.g., Ensemble-enhanced predictive engine). At step 210, the computing device (e.g., via the delivery unit 118 in FIG. 1) constructs new dynamic investment portfolio based on the series of outputs from the Ensemble-enhanced predictive engine, such as by inserting the full series of outputs, or a subset of the outputs, from the Ensemble-enhanced predictive engine into a new investment portfolio in order to deliver the portfolio to a customer.

Selecting Actively Managed Investment Portfolios

Referring to step 202, the process starts with selecting a number of actively managed investment portfolios. The data for each actively managed investment portfolio can include a time series of securities and portfolio weights for each portfolio. In some embodiments, some or all of the actively managed investment portfolios have a common reference portfolio (e.g., a standard benchmark/index, a policy portfolio, cash, and/or the like), as discussed further in conjunction with FIG. 6. In some embodiments, portfolios are selected that, on average, have a subset of the securities where the predictive accuracy is high (e.g., the manager's predictive accuracy is greater than an uninformed guess)

and/or are in a reasonably similar investment category. In some embodiments, the investment portfolios are selected in a manner such that the portfolios are independent in terms of the investment strategy, philosophy, and/or approach (e.g., to avoid redundancy of biases among the underlying portfolios that could be passed through to the new portfolio model and potentially impair the resulting diversification benefits described herein). For example, different approaches may include determining managers focusing on price value, on momentum, on innovation, on select industries, on strategic advantage, on catalyst, etc. In some embodiments, a predetermined number of portfolios can be selected, such as five portfolios, ten portfolios, fifteen portfolios, and/or the like.

As described herein, active managers are expected to have stock selection (forecasting) ability which may be limited to a small subset of stocks. This ability is not necessary expressed by their funds' performing well because, as described herein, the funds include large number of additional stocks that were added for risk management reasons (and not generation of excess return) and/or individual funds have unique biases that can be periodically out of sync with the overall market trends and/or the impact of fund fees. As a general matter, a fund will typically only include 10-20 stocks that are accurately predicted to outperform the benchmark. This subset is typically within a full portfolio of 100-250 stocks, so it is a small percent of the total holdings.

Determine Individual Security Holdings/Weights for Selected Portfolios

Referring to step 204, the techniques can dynamically populate a database (e.g., the security database 120) with up-to-date information of security holdings and portfolio weights for the selected investment portfolios. The frequency of updates to the list of holdings and portfolio weights can be daily, weekly, and/or the like. The data and/or updates can either be accurate due to the particular data source, or it can be estimated through a reconstruction process that generates close approximations to the true portfolio data.

In some embodiments, the data is obtained from one or more accurate data sources. For example, the system can have direct access to the actual holdings data series through ownership of the portfolio. This is the case, for example, for investment management firms for the portfolios they manage and control. In some embodiments, such data may only be obtained for a subset of the portfolios under review, since investment firms may not have a sufficient number of independent portfolios with common reference benchmarks. As another example, the techniques can include purchasing the information from third parties that control the data. In some embodiments, such data from an investment firm and/or third party may only be obtained for a subset of the portfolios under review, since such data sources may not have a sufficient number of independent portfolios with common reference benchmarks to allow for a proper selection of portfolios as discussed herein. As a further example, the techniques can include accessing the data through public reporting databases such as the SEC's EDGAR system. However, such data may require further processing and/or analysis as discussed herein, since the data is typically not timely, with updates only being made monthly or quarterly, with a lag (e.g., 30 day lag).

In some embodiments, the techniques may include a replication algorithm that can replicate, with high accuracy, the daily security positions within each underlying portfolio using public information. It is often desirable to reconstruct portfolio composition at a point in time, in the past, and/or at the current moment to gain an understanding of the portfolio nature, dynamics, adherence to the stated objectives, and/or to access the current portfolio makeup. Portfolio composition and its evolution in time are traditionally modeled through a few key factors that can be expressed as a linear model. Such representations are high-level, coarse models, reducing hundreds of individual instruments into a very limited number of factors. Traditional modelling methods are typically based on minimizing tracking error. The return deviation for a portfolio is a point-in-time difference between the actual portfolio returns and the reconstructed portfolio returns. The tracking error, is an aggregated statistical measure of a sequence of return deviations for a period of time.

The inventors have recognized that because traditional methods focus on minimizing the tracking error, it can result in overfitting, instability of the portfolio holdings and other non-sensible behaviors that run against the economic nature of the financial portfolios. As a result, supplementary objective functions are often added as a remedy. However, such supplementary objective functions also suffer from flaws. In particular, relative weights are assigned to each additional objective. Such relative weights have no basis in the economic nature of the portfolios and cannot be observed naturally. Therefore, an artificial step to select these relative weights, often called calibration, become a part the process.

In contrast, the replication techniques used herein create a computerized process that is capable of modelling financial portfolios in terms of actual underlying holdings in a manner that naturally produces a sensible portfolio that is free from unobservable artificial parameters. While a typical factor analysis may utilize 3-10 factors, the replication techniques used herein can handle arbitrary portfolios with hundreds and/or thousands of specifically identified holdings. Further, unlike some approaches that are based on minimizing the tracking error, the replication techniques are instead based on minimizing a deviation from the portfolio inertia process, limiting the return deviation, and/or are treated independently.

Figure 3:
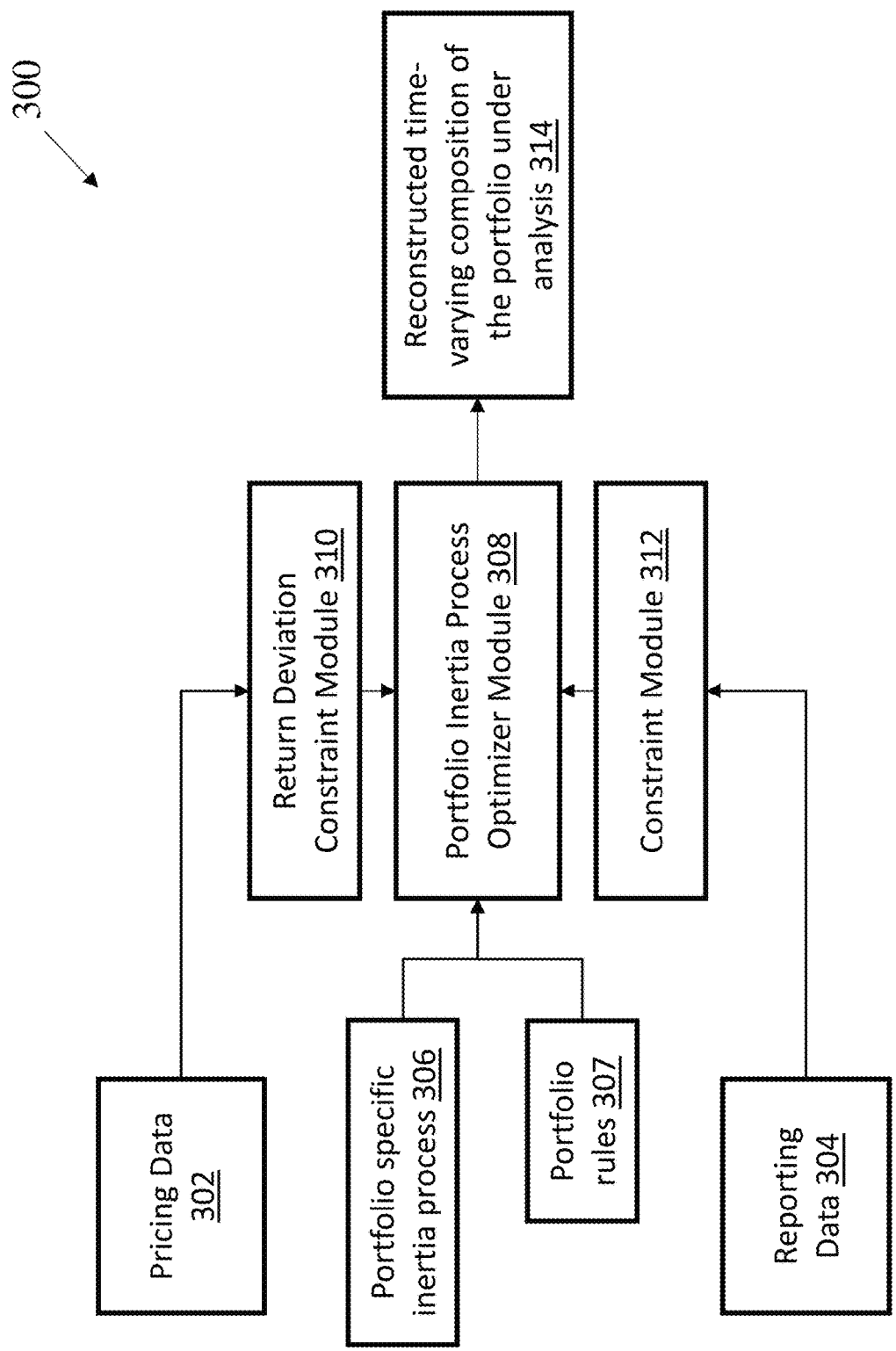
FIG. 3 is an exemplary diagram of a portfolio replication process, according to some embodiments of the technology described herein.

FIG. 3 is an exemplary diagram of a portfolio replication process 300, according to some embodiments of the technology described herein. The replication process 300 includes as inputs, generally, pricing data 302, reporting data 304, a portfolio specific inertia process 306, and portfolio policy rules 307. The pricing data 302 is processed by the return deviation constraint module 310. The reporting data 304 is processed by the constraint module. The portfolio specific inertia process 306 and the portfolio policy rule 307, along with the outputs of the return deviation constraint module 310 and the constraint module 312, are processed by the portfolio inertia process optimizer module 308 to generate a reconstructed time-varying composition of the portfolio under analysis 314. While some aspects of the computerized reconstruction process are described herein, additional aspects are described in U.S. Patent Publication No. 2019/0043130, titled "System and Method for Processing Data Sets," the contents of which is incorporated by reference herein in its entirety.

The pricing data 302 can include pricing data for the portfolios under analysis and/or for individual securities. For example, the pricing data can include one or more of portfolio prices, portfolio returns, individual security prices, and/or individual security returns. Returns of the actual portfolio and returns of potential holdings are known with some regularity and span some time interval. Using an equity mutual fund as an example, the returns of the fund as well as returns of the stocks are usually known for each day when market was open.

The pricing data 302 is processed by the return deviation constraint module 310. The return deviation constraint module 302 iteratively determines return information between a portfolio under analysis and a potential reconstructed portfolio (e.g., constructed by the portfolio inertia process optimizer module 308, as discussed herein). In some embodiments, the return deviation constraint module 302 can determine return deviations between a portfolio under analysis and a potential reconstructed portfolio at each moment of time. For example, the return deviation constraint module 310 can calculate a return deviation between the actual portfolio and a potential reconstructed portfolio at each moment of time.

In some embodiments, the return deviation constraint module 302 can the determined return deviation with thresholds (e.g., Th$^+$ and Th$^-$, as described herein). The thresholds used by the return deviation constraint module 310 can be established independently from the portfolio under analysis and/or based on the portfolio under analysis. For example, the thresholds can be set based on direct observations over the past and/or by standalone considerations rooted in the portfolio nature.

In some embodiments, the return deviation constraint module 310 can (e.g., mathematically) embed a manager's actions through time. If a constraint is not triggered, then the portfolio dynamics may be governed by the portfolio's own inertial rules conveyed by the portfolio specific inertia process (e.g., sometimes referred to as the aging process). For example, in a particular quarter, a bond is different in financial terms since it aged, but it is the same bond. As some other examples, options can be rolled into new options, futures contracts can be replaced and hedges can be updated, which are somewhat mechanical aspects of having particular type of portfolio. The constraints can be used to embed the additional actions due to the manager's decisions that are beyond just the traditional mechanical aspects of the portfolio.

In some embodiments, the deviation of the potential reconstructed portfolio t the actual portfolio can represent whether the reconstructed module captures a portfolio manager's action in response to, or in anticipation of, external events. The return deviation RD at time t can be represented using Equation 1:

$$RD(t)=R(t)-\Sigma_{i=1}^{N}r_i(t) \quad \text{(Equation 1)}$$

where:
R(t) is the actual portfolio return at time t; and
$\Sigma_{i=1}^{N}r_i(t)$ is the sum of the contribution to the return from all positions in the reconstructed portfolio $r_i(t)$.

In some embodiments, the return derivation can be limited by maximum and minimum values. For example, RD(t) can be limited between maximum (Th$^+$) and minimum values (Th$^-$) at any point in time t as shown in Equation 2:

$$Th^-<=RD(t)<=Th^+ \quad \text{(Equation 2)}$$

In some embodiments, Th$^+$ has a positive value and Th$^-$ has a negative value. In some embodiments, Th$^+$ and Th$^-$ may have the same absolute value.

In some embodiments, the return deviation can be determined using a general technique, such as that shown above in Equation 1 (e.g., such that the return deviation is generally suitable for any financial portfolio). In some embodiments, the return deviation can be determined based on the portfolio under analysis. For example, the return deviation can be determined using a different temporal profitability measure that is relevant to the portfolio under analysis.

The reporting data 304 can include reported data relevant to the portfolio(s) being analyzed by the system. For example, the reported data can include one or more of reported holdings of the portfolios (e.g., full or partial), additional reported holding information, corporate actions, and/or other events relevant to the techniques described herein. As described herein, reported holdings of the portfolio are known infrequently. For example, for a mutual fund, holdings are generally reported on a quarterly basis to a Regulator with some delay. It is also common for fund managers to disclose partial holdings at will. For example, a fund manager may report taking or closing a significant position in a company. Such partial holding information may be also fed into constraints for a single security or a few securities at the time of disclosure. Corporate events can include, for example, mergers, acquisitions, splits, and/or other life-cycle transitions that affect underlying securities. Such events can be represented as point-in-time constraints that link related securities through the event, reflect a typical manager's reaction to such event, and/or the like. Other events can be included as well. For example, a bond can be called or defaulted. Such various, moment-in-time events can be handled through a fixed or soft constraint affective at the time of the event.

The constraint module 312 processes the reporting data to determine one or more constraints for the portfolio replication process 300. For example, the constraint module 312 can be configured to constrain reconstructed holdings based on reported holdings. In some embodiments, the constraint module 312 can constraint reconstructed holdings to match reported holdings for the day of reporting either exactly and/or with some tolerance.

A portfolio specific inertia process 306 can, for example, model the natural economic evolution of the composition of holdings of a portfolio (e.g., which may cause a portfolio manager to take actions on the portfolio). In some embodiments, the inertia model can represent the evolution of a portfolio without taking into account external forces that may cause a portfolio to deviate from the expected predetermined mechanical evolution of the portfolio (e.g., aging). Since unknown external events are not modeled by the portfolio model, models can be pre-determined for different portfolios of different natures.

In some embodiments, different portfolio models can be developed for different types of financial portfolios. For example, some portfolios are designed to maintain a certain weight (or range of weights) for the securities held in the portfolio. As security prices increase and/or decrease, the holdings of the various securities may need to be adjusted over time. Such a portfolio, which is rebalanced over time to adjust the security weights, can be modeled using Equation 3, in which the weights of each security have no difference over time:

$$\omega_t^i - \omega_{t+1}^i = 0 \quad \text{(Equation 3)}$$

where:
$\omega_t^i$ is the weight in i-th asset at time t; and
$\omega_{t+1}^i$ denotes the same value in the next moment of time.

As another example, some portfolios, which can be referred to as a buy-and-hold equity portfolio, buy stocks and hold the stocks over time. Such portfolios will therefore have a constant number of shares of each stock invested through time, which can be modeled using Equation 4:

$$s_t^i - s_{t+1}^i = 0 \quad \text{(Equation 4)}$$

where:

$s_t^i$ is the shares in i-th stock at time t; and $s_{t+1}^i$ denotes the same value in the next moment of time.

As a further example, a buy-and-hold bond portfolio can include bonds that are bought and held over time. Since bonds predictively age over time, such a bond portfolio can be modeled using Equation 5:

$$n_t^i(M) - n_{t+1}^i(M - \Delta t) = 0 \qquad \text{(Equation 5)}$$

where:

$n_t^i(M)$ is the notional exposure in i-th bond with maturity M at time t; and $n_{t+1}^i(M-\Delta t)$ denotes the same value in the next moment of time, with maturity M reduced by the same amount of time $\Delta t$; and Maturity M can also be representative of other time-dependent elements of a bond definition, such as a call provision, an amortization schedule, and/or the like.

As an additional example, a commodity portfolio includes the same number of commodity contracts that age day by day in predictable manner. The commodity contracts can be sold and replaced (e.g., rolled) according to an expiration schedule. Such a commodity portfolio can be modeled using Equation 6:

$$C_t^i(E^i) - \{C_{t+1}^i(E^i - \Delta t) | C_{t+1}^j(E^j)\} = 0 \qquad \text{(Equation 6)}$$

where $C_t^i(E^i)$ is the number of i-th commodity contracts at time t with time to expiration $E^i$; and $\{C_{t+1}^i(E^i - \Delta t) | C_{t+1}^j(E^j)\}$ denotes the same contracts $C_{t+1}^i(E^i - \Delta t)$ in the next moment of time, with time to expiration reduced by the same amount of time $\Delta t$, or a new contract $C_{t+1}^j(E^j)$ in the same commodity with a new expiration date $E^j$.

The portfolio policy rules 307 can include rules that are specific to a portfolio and depend on its nature. For example, for some portfolios (e.g., a stock mutual fund), the portfolio policy rule 307 can ensure that the sum of the weights should add to 100%. As another example, the portfolio policy rule 307 may not allow negative positions. For some portfolios (e.g., a bond portfolio), the portfolio policy rule 307 may cover a specific term structure to maintain by buying a selling securities in predetermined manner. As a further example, a portfolio with futures and options may have rules that roll positions on a calendar basis. As another example, any portfolio may have a rule of hedging foreign currency exposures totally or partially. Since the rules are determined by the nature of the portfolio itself, the rules can be included into the optimizer searching for the post probably specific portfolio.

The portfolio inertia process optimizer module 308 uses the portfolio specific inertia process 306 and the portfolio policy rules 307 and uses one or more techniques to minimize the value of the portfolio specific inertia process 306. The portfolio inertia process optimizer module 308 considers various (e.g., all) possibilities of securities and weights to determine the best fitting data. The portfolio inertia process optimizer module 308 uses the data from the return deviation constraint module 310 and the constraint module 312 to limit the various possibilities into the one most fitting.

In some embodiments, the techniques can minimize an aggregate measure of deviations from the portfolio specific inertia process 306. A general representation of the minimization process is shown in Equation 7:

$$\min\left[\sum_{t=0}^{N} F(\text{Model})\right] \qquad \text{(Equation 7)}$$

Where F is an aggregation measure (e.g., absolute value, power of two, etc.); and Model represents a mathematical expression for a particular portfolio.

For example, in the case of a constant weights portfolio represented using Equation 3, the minimization can be represented using Equation 8 when using an absolute value aggregation measure:

$$\min\left[\sum_{t=0}^{N} |\omega_t^i - \omega_{t+1}^i|\right] \qquad \text{(Equation 8)}$$

Generally, the return deviation constraint module 310, portfolio inertia process optimizer module 308, and constraint module 312 operate together to generate the ultimate reconstructed time-varying composition of the portfolio under analysis 314. The portfolio inertia process optimizer module 308 is configured to represent the natural evolution in time of the portfolio composition in the absence of external events based on the portfolio model. In some embodiments, the portfolio inertia process optimizer module 308 is configured to minimize deviations from the portfolio specific inertia process 306. The return deviation constraint module 310 embeds a flow of management's decisions that cause deviations from the portfolio specific inertia process 306. The constraint module 312 can be used to incorporate any additional features relevant to the analysis of the portfolio, as described herein. In some embodiments, since constraints can be configured to operate independently, the constraints do not require any artificial parameters to balance each constraint with other constraints.

Figure 4:
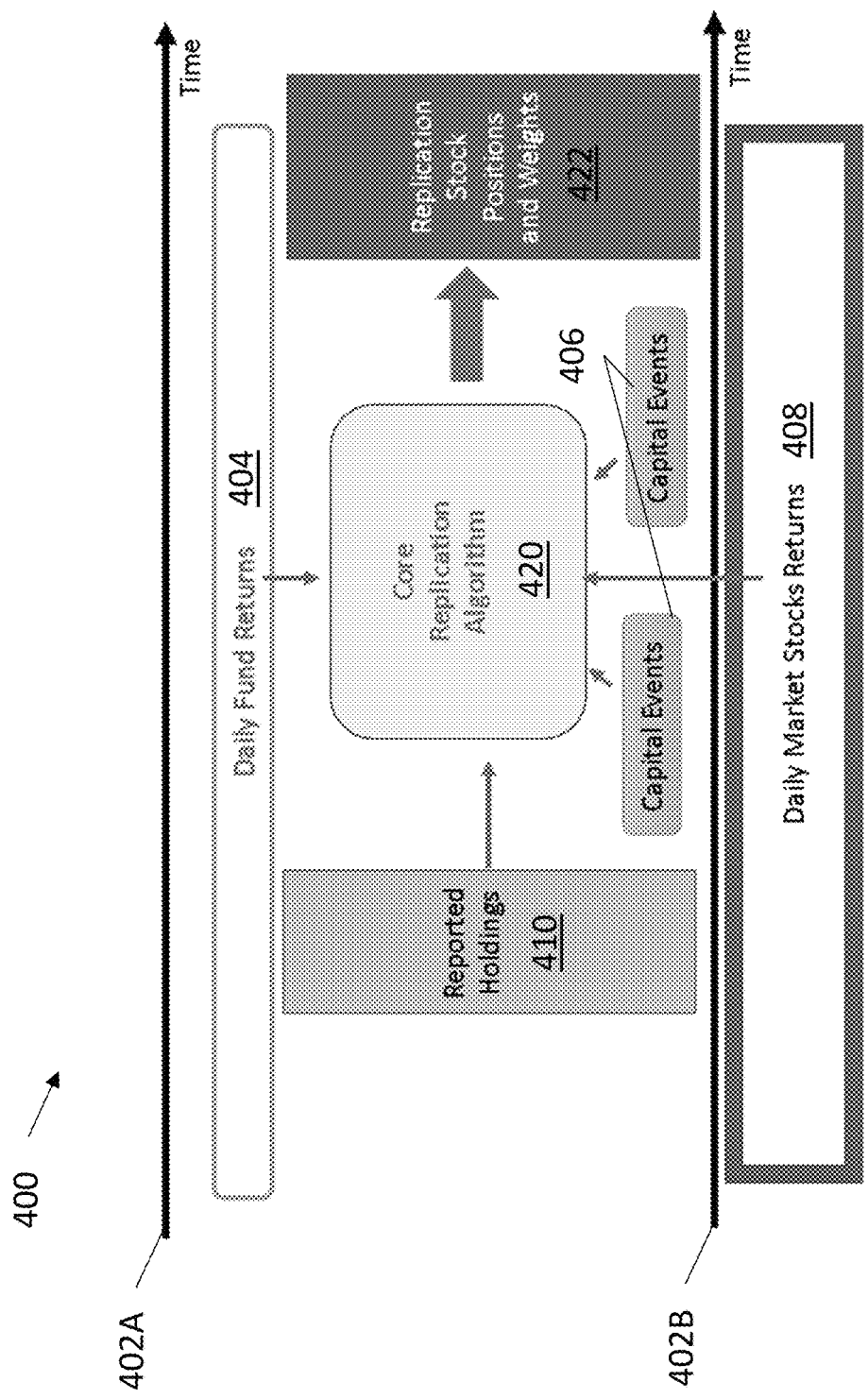
FIG. 4 is a diagram showing exemplary times of availability of data for replicating a portfolio, according to some embodiments of the technology described herein.

FIG. 4 is a diagram 400 showing exemplary times of availability of data for replicating a portfolio, according to some embodiments of the technology described herein. The diagram 400 shows availability of data to the core replication process 420, which is discussed in detail herein and can be used to produce replicated stock positions and weights 422. As shown by the arrows 402A and 402B, time progresses from the left to the right. The daily fund returns 404 is an example of aggregate information (e.g., since the daily return is one number that reflects the entire portfolio) that is available every day. The daily fund returns are of high quality in terms of data relevance since it is accurate on a per-day basis (e.g., since fund management companies are highly motivated (e.g., by a penalty) to assure its high quality). Capital events 406 can occur at discrete times, and market stock returns 408 can be determined daily. Both capital events 406 and market stock returns 408 are of a medium level of quality since they are generated by stock exchanges and involve a large number of instruments but are not connected directly to fund holdings. Reported holdings data 410 is only released periodically. While reporting holdings data 410 is directly related to fund holdings, it is severely delayed (e.g., by 2 to 4 months) and it can be of a poor quality in terms of indication of the current security holdings and/or weights of the portfolio. For example, the reported holdings 410 may be treated as supplementary information with accountability much lesser than that associated with Net Asset Values reported daily to funds. Further, the fact that reported holdings can include errors, which are likely not intentional, can make the reported holdings information 410 not suitable for direct use.

Figure 5:
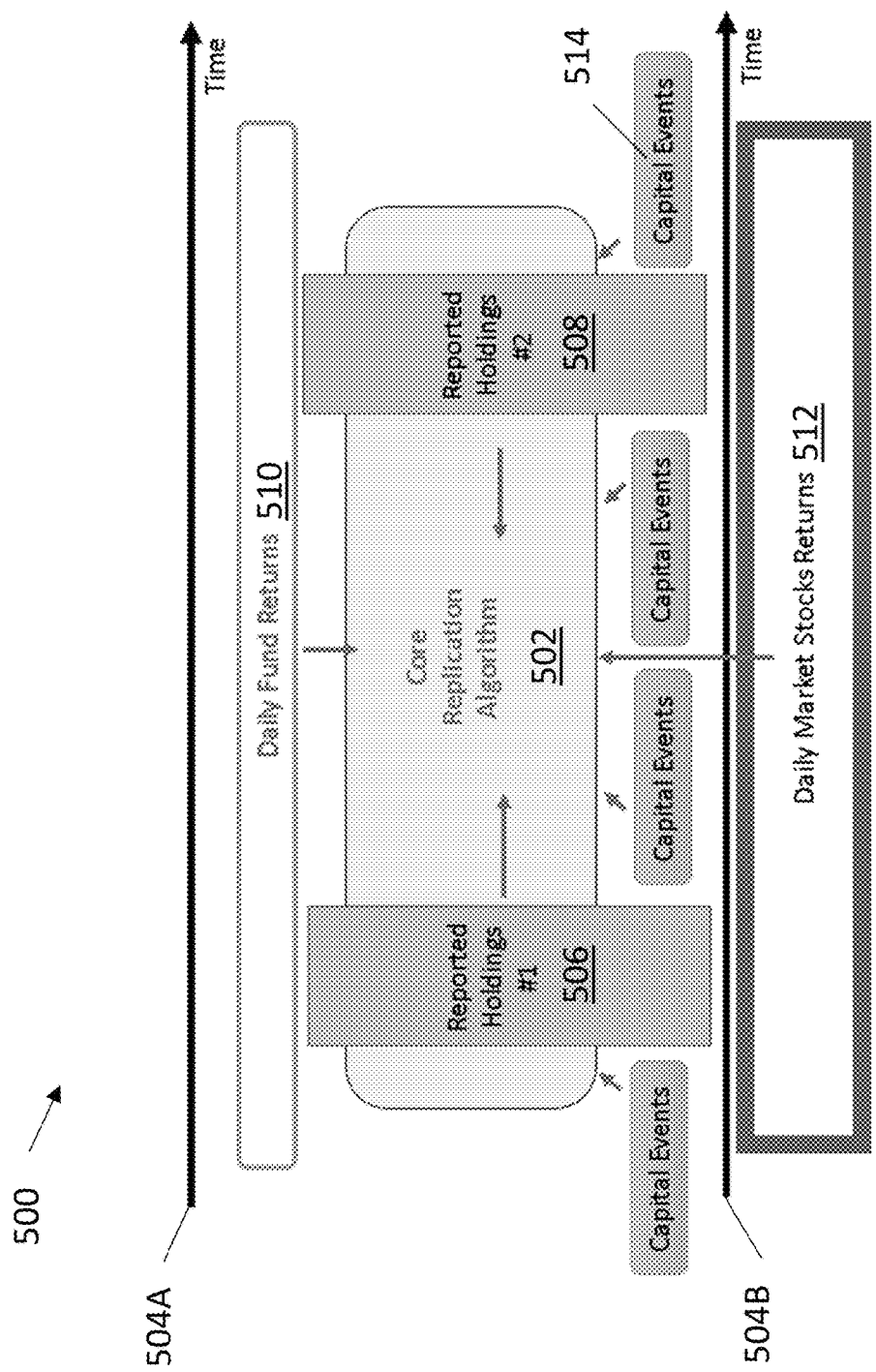
FIG. 5 is a diagram showing an example of applying a replication process to reported data, according to some embodiments of the technology described herein.

FIG. 5 is a diagram 500 showing an example of applying a replication process 502 to reported data, according to some embodiments of the technology described herein. Like with FIG. 4, as shown by the arrows 504A and 504B, time progresses from the left to the right. The exemplary time period shown in FIG. 5 includes two reported holdings—reported holdings #1 506 and reported holdings #2 508. The core replication algorithm 502 builds a coherent daily picture of fund positions for each day over the time period between reported holdings #1 506 and reported holdings #2 508 as well as from reported holdings #2 508 to the current day. As discussed in conjunction with FIG. 4, the data also includes daily fund returns 510, daily market stock returns 512, and various capital events 514. Therefore, the core replication algorithm 502 can use reported holdings #2 508 as a checkpoint on whether the core replication algorithm 502 accurately determined the holdings on a per-day basis for the period between the reported holdings #1 506 to the reported holdings #2 508. While this diagram shows just reported holdings #1 506 and reported holdings #2 508, this is for exemplary purposes only. The process described with respect to FIG. 5 can be applied sequentially to each instance of reported holdings over time and/or as well as with other reported information. Advantageously, the process described with respect to FIG. 5 can be used to correct errors and/or to discard erroneous input data during the replication process.

In some embodiments, a similar process can be applied to fund holdings historically to find indicative characteristic features of a fund, since such features may persist over time. For example, a turnover is an example of such feature. In some embodiments, the historical fund features can be incorporated into the data used by the replication process to determine daily holdings and weights for the period of time from the last known validated holdings to the current day.

In some embodiments, additional steps can be applied to prepare the data for the final out-of-sample replication. Such steps can include, for example, applying corporate actions, validating the data integrity of multiple commercial databases, and/or creating proxies for securities that are not in the databases (e.g., for foreign holdings, private securities, cash equivalents, etc.). Generally, as described herein, the core replication process can be used (a) to validate, correct, and/or discard input data and other data preparation steps, (b) to extract indicative features of the funds based on historical patterns of changing holdings, and/or (c) to predict holdings changes past last known reported holdings in a manner consistent with all the data known after that day and/or funds characteristic patterns.

Extract Output of the Predictive Engine of Each Portfolio

Referring to step 206 of FIG. 2, the dynamic and timely database of portfolio holdings (securities) and raw weights determined at step 204 may not readily reflect the output of the underlying predictive engine (e.g., sometimes referred to as an alpha engine and/or portfolio data) of the portfolio. The output of the predictive engine includes time series data for the subset of securities and weights that the manager for each underlying portfolio believes will outperform the benchmark at any given time. The output of the predictive engine also includes data indicative of the likely level of conviction each manager has related to the accuracy of each of their selected securities and weights. For example, the data regarding the likely conviction level can be determined as described further herein (e.g., using overweight and underweight positions, etc.) and may reflect an actual manager's conviction and/or may reflect a best approximation of the manager's conviction (e.g., even if the data (slightly) differs from a manager's true conviction). The inventors have discovered and appreciated that there is a decay curve associated with the accuracy of each manager's selections correlated to the ranking hierarchy of conviction. For example, each manager's #1 ranked security (e.g., top pick security) is likely to have a higher statistical success rate than a lower ranked security (e.g., the 25th ranked security). The manager's rolling series of predictive forecasts regarding which securities will outperform, as well as the conviction level of the manager related to that forecast is typically 'hidden' from a normal inspection of holdings and weights. The techniques described herein provide for extracting the output of the predictive engine, which can be performed on a periodic and frequent basis for use with generating the new model.

Figure 6:
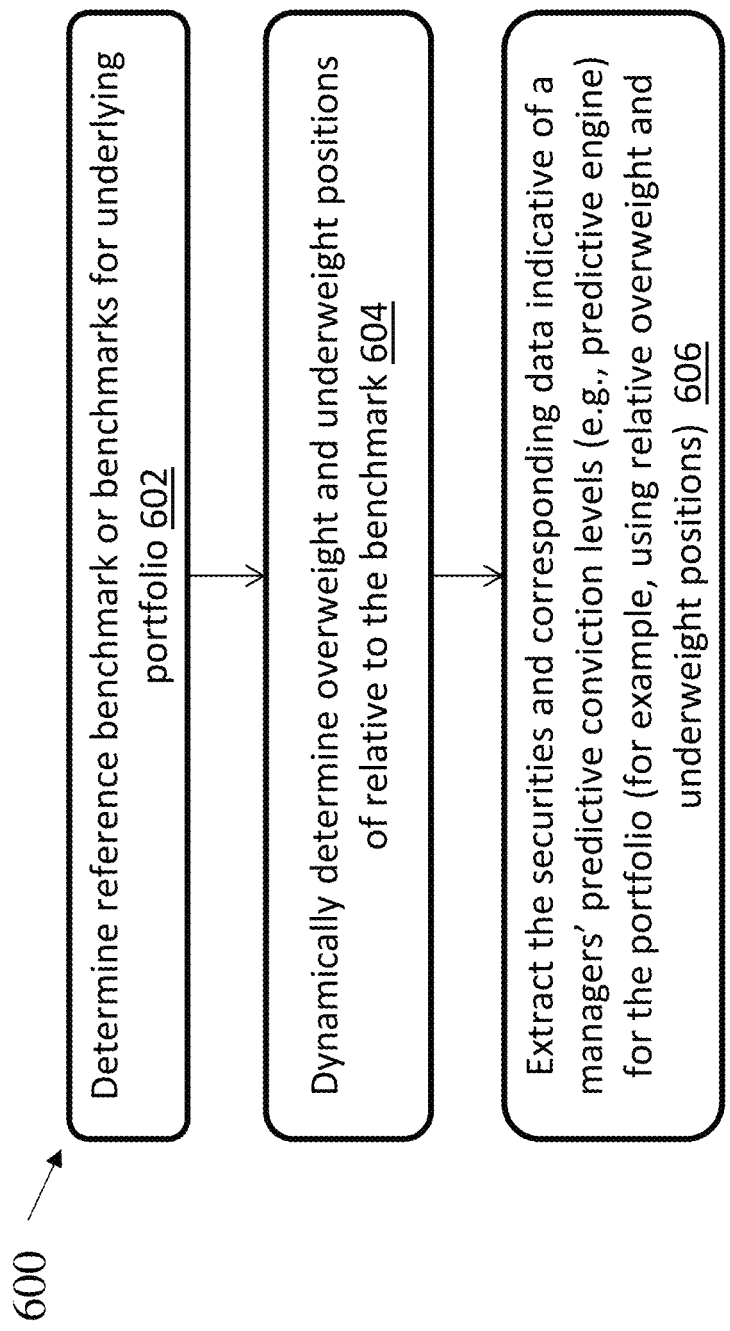
FIG. 6 shows a flow chart of an exemplary computerized process for determining the predictive engine for a portfolio, according to some embodiments of the technology described herein.

FIG. 6 shows a flow chart of an exemplary computerized process 600 for determining the output of the predictive engine for a portfolio, according to some embodiments of the technology described herein. At step 602, the computing device determines one or more reference benchmarks for the portfolio under analysis (e.g., a portfolio replicated as discussed in conjunction with FIG. 3). The reference benchmarks can be determined based on one or more characteristics of the portfolio. For example, a reference benchmark can reflect a 'target' portfolio that a manager would attempt to outperform for the portfolio. As another example, a reference benchmark can have a reasonably high overlap between securities in the benchmark and securities in the portfolio. As a further example, the reference benchmark can have an amount of overlap in number of securities with a benchmark for the ultimate EAM portfolio (e.g., a EAM benchmark, if the EAM benchmark differs from the reference benchmark).

At step 604, the computing device applies a time series model to convert the actual weights of the individual securities of the portfolio into a time series of relative weights. The relative weights can be used to determine data indicative of a manager's likely level of conviction relating to a given securities' ability to outperform (e.g., using/ranking overweight and underweight positions of the portfolio securities relative to the weights of the reference benchmark as a proxy for conviction). In some embodiments, the relative weights are determined for a common time period of the portfolio and the reference benchmark, such that the portfolio dates for the portfolio and the reference benchmark match (e.g., and any security information in the portfolio outside of the reference benchmark time period can be excluded from the process). In some embodiments, the time period window can be a period of days, weeks and/or months. For example, a window of two weeks can be used, four weeks/one month, two months, and/or the like.

At step 606, the computing device analyzes the securities and data indicative of conviction levels (e.g., also referred to herein as a rank for ease of explanation, such as rankings of overweight and underweight positions) to identify securities reflective of the output of the predictive engine, such that the securities are likely members of the set of securities selected by a manager to outperform the reference benchmark. In some embodiments, the overweight and underweight positions can be used to determine data indicative of a level of manager conviction for each of the securities generated by the predictive engine. For example, the conviction for each security, within each portfolio, can be estimated based on the deviation of the weighting of the security in the portfolio to the weighting of that same security in the reference benchmark. In some embodiments, other factors can be used to determine the conviction for each security, such as by applying as ranking of conviction within each portfolio (e.g., #1 ranked, #2 ranked, etc., and/or incorporating statistical measures determined to reflect the overall risk tendency of a manager to allow different scales of over-weighted/under-weighted positions in the portfolio, sector segmentation, etc.). In some embodiments, the techniques can include eliminating securities (e.g., where the average conviction level is neutral or negative). Securities can also be eliminated, for example, such as removing the beta anchor securities. However, this latter step can be optional, since some securities are part of one fund's alpha engine may be in another fund's beta anchor.

The resulting data from the method 600 can be a time series set of data (e.g., stored in the securities database 120) that includes the identified output of the predictive model for each of the multiple selected portfolios. As described herein, the database can also include data indicative of the level of relative conviction/level of confidence for each security (e.g., determined based on the deviation to the benchmark).

While method 600, including steps 604 and 606, determine data indicative of the rankings of each security (to determine data indicative of a managers' likely conviction level for that security) based on overweights and/or underweights with respect to a reference benchmark or portfolio, this is for exemplary purposes only and other techniques can be used either alone and/or in combination. In some embodiments, the ranking of a security can be determined based on one or more of: a level or rank of relative portfolio overweight or underweight versus a reference portfolio; a level of relative portfolio overweight or underweight versus a reference portfolio, adjusted to reflect portfolio constraints (e.g., a constraint having a maximum limit for a security's portfolio weight); actual designation by the manager (e.g., when the portfolio data is owned, obtained from the owner, and/or based on a manager's declarations); characteristics of portfolio changes (e.g., speed or scale of changes to securities or security weights based on a reference portfolio); information related to portfolio changes (e.g., speed or scale of changes or security weights in the portfolio) for portfolios that do not have a representative reference portfolio; and/or the like.

Using Ensemble Techniques to Determine an Ensemble Portfolio with New Time Series Data (which can be Used to Generate an Investment Portfolio)

Referring to steps 208 and 210 in FIG. 2, as described herein, one way for active managers of portfolios to outperform their benchmarks is to focus on their high-conviction best ideas (reflected in the predictive engine or alpha engine) and invest a substantial portion of the portfolio in those securities. Such portfolios can increase expected returns, and can therefore have a higher outperformance potential compared to other types of portfolios. However, while such a strategy may make intuitive sense, concentrating in such best ideas can trigger an unacceptably high risk of massive relative performance failures (e.g., sometimes referred to as a toxic tail) since the strategies have embedded intentional biases. The conventional response to toxic tail risk is to add a large beta anchor (e.g., a large number of additional securities) to the portfolio, which is done more to manage risk and reduce tracking error than to generate investment outperformance. Such beta anchors come with a performance penalty, and typically (heavily) dilute the alpha engine.

The techniques described herein take a different approach to managing portfolio risk than the traditional active fund approach. The techniques embed a second layer of diversification at the investment strategy level, as described further herein, which reduces the risk of significant relative underperformance such that the portfolio can become truly best idea centric without the typical associated relative performance tail risk.

The predictive/alpha engine of a particular portfolio as a discrete investment portfolio is typically not suitable as a rational, stand-alone investment because it comes with the risk of a negative relative performance distribution tail. The ensemble methods techniques described herein, which can also be referred to as an EAM solution, combine the extracted portfolio information regarding the alpha engine and/or data indicative of manager conviction for each portfolio to generate a new investment portfolio that is essentially built on data reflective of the predictive engines for all of the individual portfolios, which essentially results in a multi-expert foundation for the final investment portfolio. This process introduces a second layer of diversification (at the investment strategy level) into the portfolio design. The result is a new, enhanced alpha engine, which is used as the foundation of a new portfolio that requires little or no beta anchor.

Figure 7:
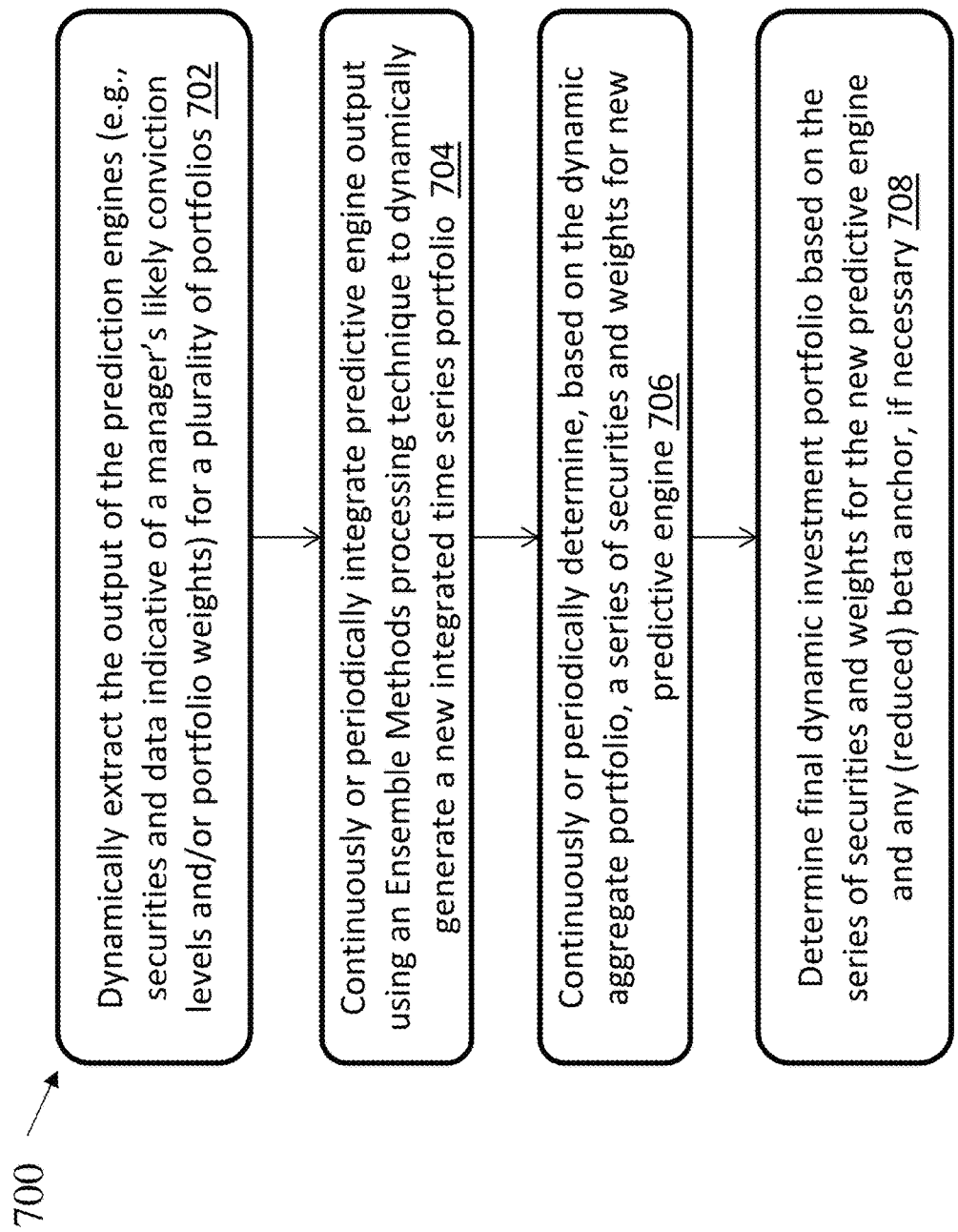
FIG. 7 shows an exemplary process for combining the predictive engine of a set of portfolios to generate an investment portfolio, according to some embodiments of the technology described herein.

FIG. 7 shows an exemplary process 700 for combining the predictive engine of a set of portfolios to generate an investment portfolio, according to some embodiments of the technology described herein. At step 702, the computing device selects the prediction engines (e.g., determined using the process described in conjunction with FIG. 6) for a set of portfolios to combine using the techniques described further herein. As described herein, the prediction engines include a time series model of the list of securities and conviction levels (e.g., determined based on overweight and underweight positions, such as by ranking the overweight and underweight positions) over a time period that are likely to be selected by the manager as top performing stocks for an associated portfolio. Therefore, the input to the ensemble process can include a time series of holdings and portfolio weights for each fund/portfolio, converted into relative weights versus the reference benchmark. In some embodiments, the prediction engine is extracted from multiple independent funds as described herein. The data can include just information associated with the prediction engine (e.g., just the top securities and/or weightings) and/or a subset of the prediction engine. In some embodiments, the data can include the full list of securities for each portfolio. Using the full list of securities can, for example, allow the high conviction of one manager to be offset by a strong negative view (e.g., represented by a significant underweight) of a different manager.

At step 704, the computing device uses ensemble methods (e.g., also referred to as ensemble learning) to integrate the time series data of the output of the predictive engines (e.g., the time series of portfolio weight positions of the securities over time, and data indicative of each manager's likely conviction level for each security) for each portfolio to generate a new integrated time series ensemble portfolio that includes a set of securities and weights. Ensemble learning techniques can use multiple learners, which are sometimes referred to as base learners. The base learners can be generated by a base learning algorithm, such as a decision tree, neural network, and/or the like, using training data. Then the base learners are combined for the ultimate ensemble. Compared to traditional machine learning approaches that try to learn one hypothesis from the training data, the ensemble techniques can construct a set of hypotheses that are combined for use.

It should be appreciated that there are a wide variety of mathematical techniques that can be used to translate the predictions from the underlying individual portfolio predictive engines into an optimized new predictive engine. In some embodiments, if the data indicates that a majority of the extracted prediction engines agree on the predicted outcome of a security, then it can be processed by the ensemble methods techniques as having a high confidence in such a prediction. Alternately, if the data indicates that there is broad disagreement on a security, then the ensemble techniques can process the data to determine a low confidence in its prediction. Exemplary techniques that can be used to combine the predictive decision-making of the underlying active portfolios may include, without limitation, pro rata, average, weighted average, majority, weighted majority, error correction (e.g., boosting), bagging, stacking, weighted sum based on predictive quality (e.g. bucket of models) or a meta learning algorithm (e.g. Adaptive Boosting (or "AdaBoost")), and/or the like.

As an illustrative example, a pro rata ensemble methods technique can be employed which averages the overweight/underweight positions for each security in each portfolio (e.g., at each point in time calculated for the predictive engines) on a pro rata basis to create an aggregated portfolio of securities, where the resulting overweight and underweight positions reflect the average level of conviction for each manager of the portfolios being combined.

In some embodiments, the ensemble techniques can factor in one or more adjustments to the ensemble process. For example, adjustments can be included and/or determined based on one or more factors. Such adjustments can include, for example, creating a multiplier effect for securities that have overweight positions by some or all (e.g., most of) the underlying portfolios. As another example, adjustments can include creating a weighting scale during the integration phase reflective of each portfolio's average position size (e.g., such that as the number of securities increase, the average position size decreases).

In some embodiments, the weights of the securities in the aggregated portfolio can be scaled. For example, if the weights of the securities of the aggregated portfolio can be scaled in order to achieve a 100% sum for total portfolio weights.

At step 706, the computing device determines, based on the securities in the new time series data of the aggregate ensemble portfolio, the number of securities to include as the output from a new predictive engine (e.g., also referred to herein as the Ensemble engine, for ease of description). In some embodiments, the new time series data can be filtered and/or screened to generate a subset list of securities and/or modified weights, e.g., based on objectives such as improved predictive accuracy, improved risk management, desired investment characteristics, and/or the like. In some embodiments, the techniques can include limiting the number of securities to a subset of securities based on a ranking system (e.g., the top 50 securities based on ranking by pro rata, aggregate conviction levels of the underlying portfolios, etc.). In some embodiments, the techniques can include determining a predetermined number of securities (e.g., 10 securities, 20 securities, establishing a limit of no more than 75 securities) and/or a number of securities in a predetermined range of desired securities (e.g., 20-25 securities, 40-50 securities). In some embodiments, the determined number of securities can be based on a desired diversification of security-level non-systematic risk, an expected cost of trading, liquidity, overall risk management considerations, and/or the like. In some embodiments, the weights of the securities for the new predictive engine can be scaled as discussed herein (e.g., to achieve a 100% sum for total portfolio weights). In some embodiments, the techniques can include filtering some/all of the securities based on inclusion within a secondary reference portfolio (e.g., limiting some or all of the security list to those also included in a benchmark portfolio, such as the Russell 1000 Value, to create a value tilt). In some embodiments, the techniques can include screening some/all of the securities based on absolute or relative ranking versus investment characteristics. For example, the securities can be limited to securities in the lowest half of a ranking determined based on absolute volatility, to those securities with an absolute volatility level less than that of a reference portfolio, and/or the like.

In some embodiments, step 706 generates time series data for the portfolio, including security and weight information for each applicable time period. A new optimal EAM portfolio can be generated for each period of time that is evaluated and/or regenerated. For example, a one week cycle, a two week cycle, a one month cycle, and/or the like can be used to regenerate the EAM portfolio. As explained herein, to regenerate the EAM portfolio the underlying data for each individual portfolio is first updated in order to provide the new window for the new EAM portfolio.

At step 708, the new predictive engine determined at step 706 is used to determine a final (new) investment portfolio. In some embodiments, the final investment portfolio may be constructed to include the output of step 706 and not to include any additional securities in addition to those generated by the new predictive engine. In some embodiments, additional beta anchor securities can be added to the final investment portfolio. For example, the computing device can determine a set of one or more beta anchor securities to include based on the embedded diversification of the new predictive engine, which can be impacted by factors such as the volatility of the securities in the reference benchmark, the investor's tolerance level of maximum relative performance distribution tails, the turnover and/or portfolio concentration of the underlying portfolios, and/or the number of underlying portfolios used. In some embodiments, the computing device can determine that the output of the new predictive engine has an expected relative performance distribution range greater than a desired range. As described herein, the additional beta anchor securities can be included based on the distribution tail risk of the output of the new predictive engine and/or the desired risk management objectives for the ultimate portfolio. The additional beta anchor securities can each have a high correlation to the reference portfolio.

In some embodiments, the techniques can include applying leverage or de-leveraging to generate the investment portfolio, e.g., to achieve goals such as volatility targeting. For example, leverage can be added by borrowing against the portfolio, and using the loan to purchase more securities. De-leveraging can be accomplished by, for example, adding cash to a portfolio. In some embodiments, the techniques can include adding additional securities, such as additional securities to achieve investment goals (e.g., additional securities with high dividends to achieve a high dividend yield). In some embodiments, the techniques can include removing securities, such as removing securities for additional investment and/or preference considerations (e.g., disliked securities, securities against religious and/or ethical convictions, and/or the like). In some embodiments, the techniques can include changing the securities and/or portfolio weights to reflect implementation considerations. For example, the techniques can include modifying the securities and/or portfolio weights to reflect liquidity or trading considerations.

In some embodiments, the techniques can include tailoring the new EAM portfolio to achieve portfolio objectives in different spaces. Once the new prediction engine is determined, the underlying data can be transferred or mapped over to a different objective, if desired. To build a portfolio with an objective that deviates from a traditional objective (e.g., from the S&P 500 to, for example, an environmentally friendly portfolio) typically requires a manager dedicated to the specific objective. The more specialized the objective, the smaller the chance there is enough manager expertise and/or a sufficient number of competitively viable portfolios to efficiently build such funds. For example, a wide large cap blend category includes several hundreds of competing funds, compared to less than a handful of environmentally friendly large cap funds. By using the techniques described herein to accurately extract the high conviction predictive security selections from a portfolio designed to outperform a traditional benchmark, the system can be configured to transfer and reuse this information to a different, specialized objective (e.g., which may be expressed by a specific set of securities, by particular guidance on weights, or other characteristics). Therefore, by focusing on a large number of disparate portfolios and their alpha engines, the data can provide implicit security-based forecasts from multiple experts, which the system can then use to inform decisions in an area that may not even be pursued by any specific manager and/or currently available at all in the market place. For example, to build an Environmental, Social and Governance (ESG) fund, the securities in the aggregated portfolio can be ranked from best to worst, and then any undesirable (e.g., non-ESG) securities can be stripped out.

Exemplary Return Improvements

The EAM techniques described herein to construct portfolios by integrating a series of data from single manager/single expert investment portfolios into a multi-expert portfolio can provide various benefits. For example, the techniques can improve the expected return (e.g., the predictive accuracy) of the security decisions for the subset of the portfolio intended to drive excess return (e.g., reflected by the predictive engine of the new output portfolio). As another example, the techniques can reduce the relative distribution tails from the resulting alpha engine of the output portfolio by diversifying the unique set of biases from each of the underlying investment portfolios. As a further example, when the new predictive engine is used to create an investment portfolio, because of the reduced relative distribution tails, the new predictive engine reduces (or eliminates altogether) the need for a beta anchor (a set of beta anchor securities), which can reduce and/or eliminate an otherwise commonplace performance impairment in traditional investment portfolios. As a further example, the techniques can be used to reach any desired level of distribution tail risk reduction by increasing the number of distinct portfolios (and thus data for distinct managers) included in the process. In some embodiments, the reduction in distribution tails is based on the square root of the number of underlying investment portfolios when assuming independent portfolio designs. For example, if the system uses nine underlying portfolios, it can reduce distribution tails by a factor of three; sixteen portfolios can reduce by a factor of four, and so on. Reducing the distribution tails by a factor of three can be similar to the effect from a sixty-five percent beta anchor.

Figure 8A:
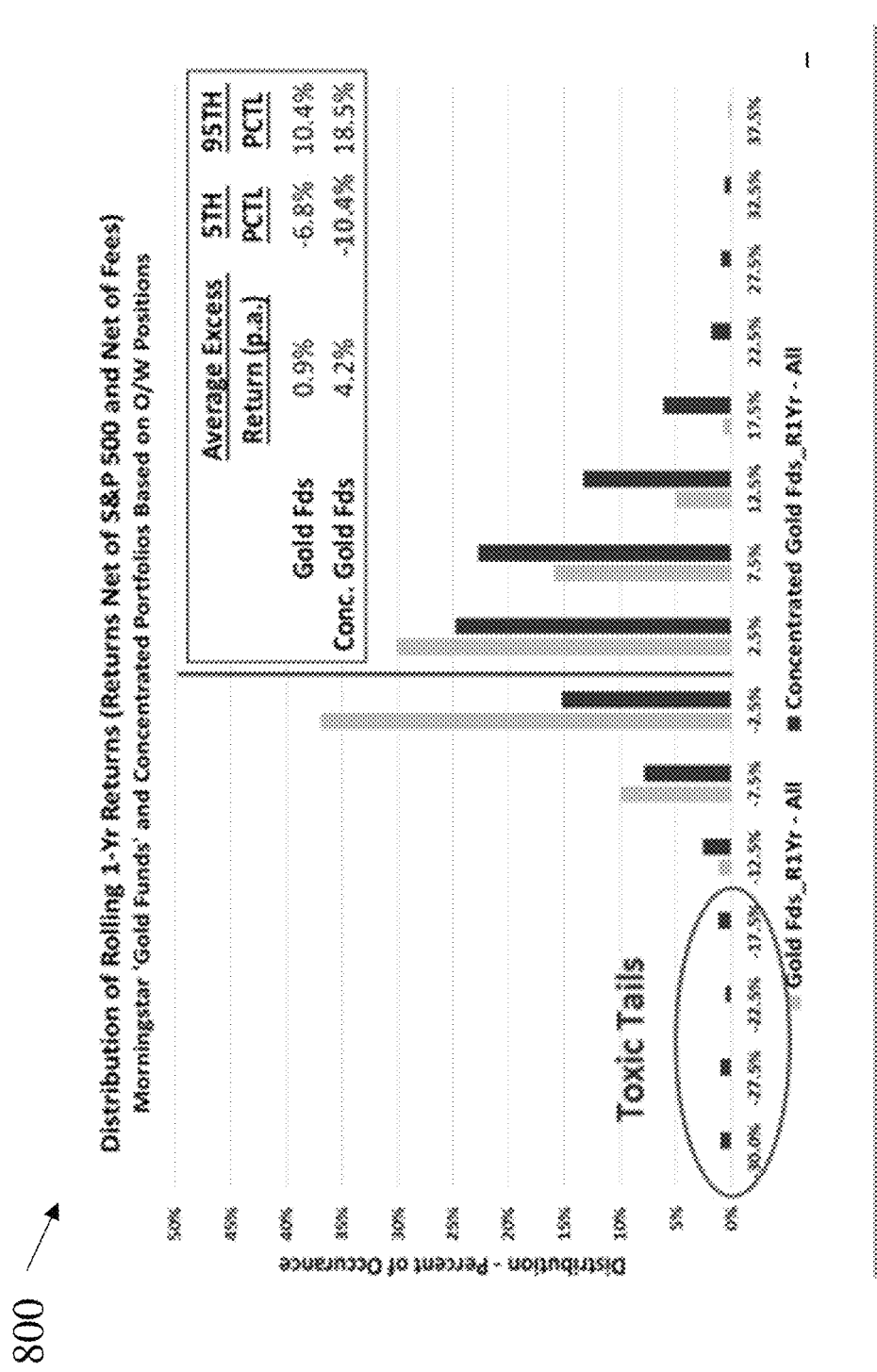
FIG. 8A is a graph showing data for a study that evaluated the performance of a set of large-cap Gold-rated funds (based on Morningstar, Inc's rating system), according to some examples.

FIG. 8A is a graph 800 for a study that evaluated the performance of 16 large-cap funds that Morningstar designated as Gold Rated in January 2017, according to some examples. By extracting each fund's overweight positions relative to the S&P 500, renormalizing, and then updating every two weeks, the study constructed 16 concentrated portfolios. The Gold-rated funds and the corresponding concentrated portfolios were compared over rolling one-year periods from March 2012 to September 2018. The Gold-rated funds did well and delivered an average annual excess return of 0.9%. Due to the risk management benefit of the beta anchor, the bottom 5% of the Gold-rated funds' relative return distribution was limited to −6.8% and did not qualify as a toxic tail event. The Concentrated Portfolios outperformed with average annual excess returns of 4.2%. However, their concentrated natures created an expanded negative tail, with the bottom 5% of the one-year returns creating a Toxic Tail of −1,040 basis points (bps). FIG. 8A illustrates how the beta anchor dilutes the alpha engine's net benefits, and acts as a drag on returns. For example, assume a manager's alpha engine would deliver 200 bps in annual, undiluted excess return and that the fund has a beta anchor equal to 75% of the portfolio. The diluted, pre-fee result is therefore 50 bps of annual excess return (200 bps*(100%−75%)). After fees, such a portfolio would likely underperform.

FIG. 8B shows three graphs over rolling one-year periods that compare large-cap Gold-rated funds, corresponding concentrated portfolios, and an EAM portfolio built from the large-cap Gold-rated funds, according to some embodiments of the technology described herein. The EAM techniques adds a layer of diversification that reduces the risk of toxic tails. Diversification can be an important tool because it can decrease overall portfolio risk by reducing non-systematic risk and the dispersion of return distributions. Traditionally, such diversification is introduced to portfolios at the security level. However, by injecting that second layer of diversification at the investment strategy level using the techniques described herein, the techniques integrate multiple investment strategies, and thus diversify individual managers' biases and substantially reduces the potential for toxic tails.

The techniques described herein were used to build an EAM portfolio as part of the gold fund analysis discussed in conjunction with FIG. 8A. FIG. 8B includes three graphs: graph 830 shows the probability distribution of the Gold-rated funds, graph 850 shows the concentrated portfolios, and graph 870 shows the EAM portfolio, built from the 16 Gold-rated funds, over rolling one-year periods. Graph 830 shows that the Gold-rated funds had a high percentage (67%) of relative results around a band of +/−500 bps, and a limited breadth of tails shown by the width 832 between dotted lines. Graph 850 shows that the concentrated portfolio results shifted to the right, which indicates improved average returns, but had clearly expanded tails that spread from −30% to 40% (as shown by the width 852 between dotted lines), significant exposure to toxic tails (5.1% rate), and suffered multiple extreme toxic tails of more than a −20% shortfall. Table 870 shows that the EAM Portfolios dramatically compressed the tail distribution (reduced width 872 between the dotted lines), shifted results even further to the right than the concentrated portfolio results due to improved returns, with 88% in positive territory, and no toxic tail events. Therefore, the EAM Portfolio's added layer of diversification more effectively reduced negative tail risk than the industry standard use of a beta anchor.

FIG. 8C is a table 880 showing Gold fund, concentrated Gold fund, and EAM portfolio results, according to some embodiments of the technology described herein. Table 880 shows that the Gold-rated funds, on average, delivered an annual outperformance of 0.9% (after fees). The concentrated portfolios delivered excess returns of 420 bps to achieve an annual performance of 4.20%, improving upon the Gold-rated funds' results by 330 bps, which as described herein came at the cost of a significant risk of toxic tails. The EAM Portfolio achieved 550 bps in annual excess returns, capturing 90 bps excess return of the Gold-rated funds, plus the additional 330 bps increase delivered by the concentrated portfolios, plus an incremental 130 bps due to using the ensemble methods described herein. Thus, as shown, the best-idea-centric EAM portfolio increases excess returns.

Figure 9:
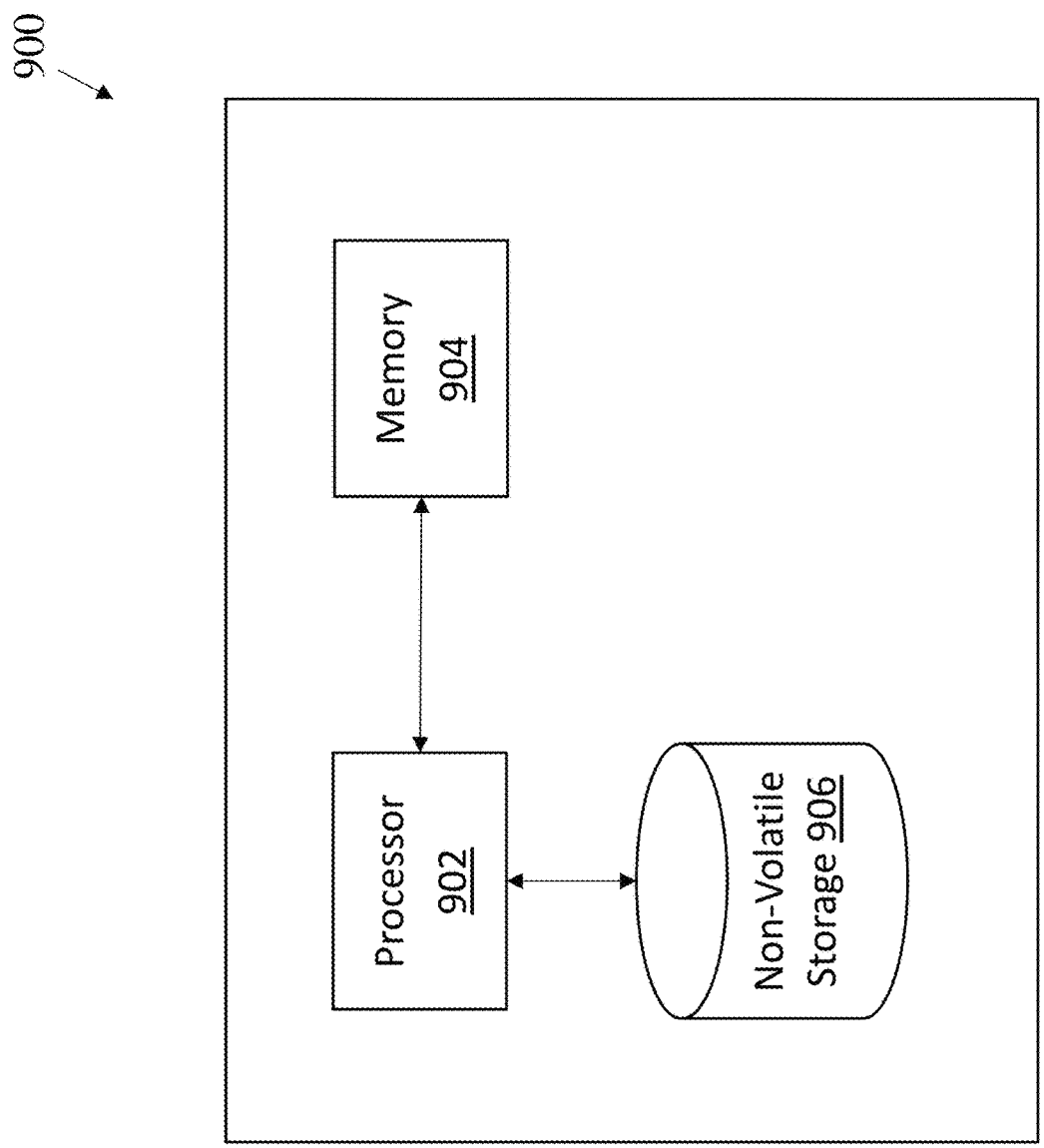
FIG. 9 shows an illustrative implementation of a computer system that may be used in connection with any of the embodiments of the disclosure provided herein.

An illustrative implementation of a computer system 900 that may be used in connection with any of the embodiments of the disclosure provided herein is shown in FIG. 9. For example, the computer system 900 can be used for the computing device 102 in FIG. 1. The computer system 900 may include one or more computer hardware processors 902 and one or more articles of manufacture that comprise non-transitory computer-readable storage media (e.g., memory 904 and one or more non-volatile storage devices 906). The processor 902(*s*) may control writing data to and reading data from the memory 904 and the non-volatile storage device(s) 906 in any suitable manner. To perform any of the functionality described herein, the processor(s) 902 may execute one or more processor-executable instructions stored in one or more non-transitory computer-readable storage media (e.g., the memory 904), which may serve as non-transitory computer-readable storage media storing processor-executable instructions for execution by the processor(s) 902.

The computer system 900 can be any type of computing device with a processor 902, memory 904, and non-volatile storage device 906. For example, the computer system 900 can be a server, desktop computer, a laptop, a tablet, or a smartphone. In some embodiments, the computer system 900 can be implemented using a plurality of computing devices, such as a cluster of computing devices, virtual computing devices, and/or cloud computing devices.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method, comprising:
using at least one computer hardware processor to perform:
accessing data indicative of a plurality of existing portfolios, wherein:
each of the plurality of existing portfolios comprises time series data indicative of an associated set of securities and associated weights of each security in the set of securities of the existing portfolio compared to other securities in the existing portfolio; and
at least two existing portfolios of the plurality of existing portfolios are each associated with an existing reference portfolio comprising reference time series data indicative of a reference set of securities and associated reference weights of each security in the set of reference securities in the reference portfolio compared to other securities in the reference portfolio;
determining ranked portfolio data for each of the plurality of existing portfolios based on the associated existing reference portfolios, the ranked portfolio data for each of the plurality of existing portfolios indicating portfolio-specific conviction rankings for securities within the existing portfolio, wherein determining the ranked portfolio data comprises:
determining, for each of a plurality of securities in the set of securities, difference data by computing a difference between the weight of the security for the existing portfolio at a specific time period and a reference weight of the security for the reference portfolio at the specific time period; and
determining conviction ranking data for each of the plurality of securities compared to remaining securities of the plurality of securities by:
comparing the difference data of each security to the reference weight for the security in the reference portfolio to determine a relative weighting of each security; and
using the relative weighting of each security to generate the ranked portfolio data, wherein:
the conviction ranking data is higher for securities with larger relative weightings; and
the conviction ranking data is lower for securities with lower relative weightings;
determining, based on the conviction ranking data and using an ensemble machine learning technique, an ensemble portfolio comprising new time series data indicative of a new set of securities and associated new weights, comprising:
executing a first learner algorithm on the conviction ranking data for each of the plurality of securities to extract first conviction ranking data to determine a first set of securities and associated first weights for the first set of securities as output of the first learner algorithm, wherein the first learner algorithm was trained according to a first hypothesis;
executing a second learner algorithm on the conviction ranking data for each of the plurality of securities to extract second conviction ranking data to determine a second set of securities and associated second weights for the second set of securities as output of the second learner algorithm, wherein the second learner algorithm was trained according to a second hypothesis different than the first hypothesis; and
combining, via the ensemble machine learning technique, based on the first weights and the second weights, the first and second sets of securities to generate the new set of securities and the associated new weights for the ensemble portfolio, such that the ensemble portfolio can have either no beta anchor or a smaller beta anchor than beta anchors of each of the plurality of existing portfolios; and
storing the ensemble portfolio, comprising the new time series data indicative of the new set of securities and associated new weights, in a portfolio database.

2. The method of claim 1, wherein accessing the data indicative of the plurality of existing portfolios comprises, for at least one existing reference portfolio of the associated existing reference portfolios:
obtaining the at least one existing reference portfolio through direct ownership of the at least one existing reference portfolio;
obtaining the at least one existing reference portfolio from an owner of the at least one existing reference portfolio;
obtaining the at least one existing reference portfolio by purchasing the at least one existing reference portfolio from a public source; or
some combination thereof.

3. The method of claim 1, wherein the conviction ranking data for each of the plurality of securities comprises data indicative of a manager's likely conviction level for the security compared to the remaining securities of the plurality of securities.

4. The method of claim 1, further comprising determining the ranked portfolio data for each of the plurality of existing portfolios for a plurality of time periods that comprises the specific time period and at least one additional different time period, comprising determining the difference data for each of the plurality of time periods.

5. The method of claim 1, wherein determining the ranked portfolio data for at least one existing portfolio of the at least two existing portfolios comprises:
determining, for each security of a subset of securities of the plurality of securities:
a speed of change of the security, the weight of the security, or both, based on the associated existing reference portfolio; and
a scale of change of the security, the weight of the security, or both, compared to the associated existing reference portfolio; and
determining a ranking for each security of the subset of securities based on the determined speed, scale, or both.

6. The method of claim 1, wherein determining the ranked portfolio data for at least one existing portfolio of the plurality of existing portfolios comprises:
determining for each security of a subset of securities of the plurality of securities:
a speed of change of the security, the weight of the security, or both, over time; and
a scale of change of the security, the weight of the security, or both, over time; and
determining the conviction ranking data for each replicated security of the subset of securities based on the determined speed, scale, or both.

7. The method of claim 1, wherein combining, based on the first weights and the second weights, the first and second sets of securities to generate the new set of securities and associated new weights for the ensemble portfolio comprises determining the new time series data using a pro rata ensemble technique, comprising averaging the first and second sets of securities and first and second weights on a pro rata basis to create the new time series data of the ensemble portfolio.

8. The method of claim 1, further comprising generating a subset of the new set of securities, modifying the associated new weights, or both, comprising one or more of:
selecting the subset of the new set of securities based on a ranking associated with each security in the new set of securities determined using the ensemble technique;
determining one or more securities in the subset of securities by determining the one or more securities are also included in a secondary reference portfolio; and/or
selecting the new subset of the new securities based on a determined investment characteristic of each of the securities in the new set of securities, wherein the determined investment characteristic comprises one or more of:
volatility of the security;
dividend yield of the security;
market capitalization of the security; and
correlation of the security to a secondary reference portfolio.

9. The method of claim 1, further comprising generating a new investment portfolio based on the ensemble portfolio without modifying the new set of securities and associated new weights.

10. A system, comprising:
at least one hardware processor; and
at least one non-transitory computer-readable storage medium storing processor-executable instructions that, when executed by the at least one hardware processor, cause the at least one hardware processor to perform:
accessing data indicative of a plurality of existing portfolios, wherein:
each of the plurality of existing portfolios comprises time series data indicative of an associated set of securities and associated weights of each security in the set of securities of the existing portfolio compared to other securities in the existing portfolio; and
at least two existing portfolios of the plurality of existing portfolios are each associated with an existing reference portfolio comprising reference time series data indicative of a reference set of securities and associated reference weights of each security in the set of reference securities in the reference portfolio compared to other securities in the reference portfolio;
determining ranked portfolio data for each of the plurality of existing portfolios based on the associated existing reference portfolios, the ranked portfolio data for each of the plurality of existing portfolios indicating portfolio-specific conviction rankings for securities within the existing portfolio, wherein determining the ranked portfolio data comprises:
determining, for each of a plurality of securities in the set of securities, difference data by computing a difference between the weight of the security for the existing portfolio at a specific time period and a reference weight of the security for the reference portfolio at the specific time period; and
determining conviction ranking data for each of the plurality of securities compared to remaining securities of the plurality of securities by:
comparing the difference data of each security to the reference weight for the security in the reference portfolio to determine a relative weighting of each security; and
using the relative weighting of each security to generate the ranked portfolio data, wherein:
the conviction ranking data is higher for securities with larger relative weightings; and
the conviction ranking data is lower for securities with lower relative weightings;
determining, based on the conviction ranking data and using an ensemble machine learning technique, an ensemble portfolio comprising new time series data indicative of a new set of securities and associated new weights, comprising:
executing a first learner algorithm on the conviction ranking data for each of the plurality of securities to extract first conviction ranking data to determine a first set of securities and associated first weights for the first set of securities as output of the first learner algorithm, wherein the first learner algorithm was trained according to a first hypothesis;
executing a second learner algorithm on the conviction ranking data for each of the plurality of securities to extract second conviction ranking data to determine a second set of securities and associated second weights for the second set of securities as output of the second learner algorithm, wherein the second learner algorithm was trained according to a second hypothesis different than the first hypothesis; and
combining, via the ensemble machine learning technique, based on the first weights and the second weights, the first and second sets of securities to generate the new set of securities and the associated new weights for the ensemble portfolio, such that the ensemble portfolio can have either no beta anchor or a smaller beta anchor than beta anchors of each of the plurality of existing portfolios; and
storing the ensemble portfolio, comprising the new time series data indicative of the new set of securities and associated new weights, in a portfolio database.

11. The system of claim 10, wherein accessing the data indicative of the plurality of existing portfolios comprises, for at least one existing reference portfolio of the associated existing reference portfolios:
obtaining the at least one existing reference portfolio through direct ownership of the at least one existing reference portfolio;
obtaining the at least one existing reference portfolio from an owner of the at least one existing reference portfolio;
obtaining the at least one existing reference portfolio by purchasing the at least one existing reference portfolio from a public source; or
some combination thereof.

12. The system of claim 10, wherein the conviction ranking data for each of the plurality of securities comprises data indicative of a manager's likely conviction level for the security compared to the remaining securities of the plurality of securities.

13. The system of claim 10, wherein the instructions further cause the at least one hardware processor to determine the ranked portfolio data for each of the plurality of existing portfolios for a plurality of time periods that comprises the specific time period and at least one additional different time period, comprising determining the difference data for each of the plurality of time periods.

14. The system of claim 10, wherein determining the ranked portfolio data for at least one existing portfolio of the at least two existing portfolios comprises:
   determining, for each security of a subset of securities of the plurality of securities:
      a speed of change of the security, the weight of the security, or both, based on the associated existing reference portfolio; and
      a scale of change of the security, the weight of the security, or both, compared to the associated existing reference portfolio; and
   determining a ranking for each security of the subset of securities based on the determined speed, scale, or both.

15. The system of claim 10, wherein determining the ranked portfolio data for at least one existing portfolio of the plurality of existing portfolios comprises:
   determining for each security of a subset of securities of the plurality of securities:
      a speed of change of the security, the weight of the security, or both, over time; and
      a scale of change of the security, the weight of the security, or both, over time; and
   determining the conviction ranking data for each replicated security of the subset of securities based on the determined speed, scale, or both.

16. The system of claim 10, wherein combining, based on the first weights and the second weights, the first and second sets of securities to generate the new set of securities and associated new weights for the ensemble portfolio comprises determining the new time series data using a pro rata ensemble technique, comprising averaging the first and second sets of securities and first and second weights on a pro rata basis to create the new time series data of the ensemble portfolio.

17. The system of claim 10, wherein the instructions further cause the at least one hardware processor to generate a subset of the new set of securities, modifying the associated new weights, or both, comprising one or more of:
   selecting the subset of the new set of securities based on a ranking associated with each security in the new set of securities determined using the ensemble technique;
   determining one or more securities in the subset of securities by determining the one or more securities are also included in a secondary reference portfolio; and/or
   selecting the new subset of the new securities based on a determined investment characteristic of each of the securities in the new set of securities, wherein the determined investment characteristic comprises one or more of:
   volatility of the security;
   dividend yield of the security;
   market capitalization of the security; and
   correlation of the security to a secondary reference portfolio.

18. The system of claim 10, wherein the instructions further cause the at least one hardware processor to generate a new investment portfolio based on the ensemble portfolio without modifying the new set of securities and associated new weights.

19. At least one non-transitory computer readable storage medium storing processor-executable instructions that, when executed by at least one processor, cause the at least one processor to perform:

accessing data indicative of a plurality of existing portfolios, wherein:
   each of the plurality of existing portfolios comprises time series data indicative of an associated set of securities and associated weights of each security in the set of securities of the existing portfolio compared to other securities in the existing portfolio; and
   at least two existing portfolios of the plurality of existing portfolios are each associated with an existing reference portfolio comprising reference time series data indicative of a reference set of securities and associated reference weights of each security in the set of reference securities in the reference portfolio compared to other securities in the reference portfolio;

determining ranked portfolio data for each of the plurality of existing portfolios based on the associated existing reference portfolios, the ranked portfolio data for each of the plurality of existing portfolios indicating portfolio-specific conviction rankings for securities within the existing portfolio, wherein determining the ranked portfolio data comprises:
   determining, for each of a plurality of securities in the set of securities, difference data by computing a difference between the weight of the security for the existing portfolio at a specific time period and a reference weight of the security for the reference portfolio at the specific time period; and
   determining conviction ranking data for each of the plurality of securities compared to remaining securities of the plurality of securities by:
      comparing the difference data of each security to the reference weight for the security in the reference portfolio to determine a relative weighting of each security; and
      using the relative weighting of each security to generate the ranked portfolio data, wherein:
         the conviction ranking data is higher for securities with larger relative weightings; and
         the conviction ranking data is lower for securities with lower relative weightings;

determining, based on the conviction ranking data and using an ensemble machine learning technique, an ensemble portfolio comprising new time series data indicative of a new set of securities and associated new weights, comprising:
   executing a first learner algorithm on the conviction ranking data for each of the plurality of securities to extract first conviction ranking data to determine a first set of securities and associated first weights for the first set of securities as output of the first learner algorithm, wherein the first learner algorithm was trained according to a first hypothesis;
   executing a second learner algorithm on the conviction ranking data for each of the plurality of securities to extract second conviction ranking data to determine a second set of securities and associated second weights for the second set of securities as output of the second learner algorithm, wherein the second learner algorithm was trained according to a second hypothesis different than the first hypothesis; and
   combining, via the ensemble machine learning technique, based on the first weights and the second weights, the first and second sets of securities to generate the new set of securities and the associated new weights for the ensemble portfolio, such that the ensemble portfolio can have either no beta anchor or a smaller beta anchor than beta anchors of each of the plurality of existing portfolios; and storing the ensemble portfolio, comprising the new time series data indicative of the new set of securities and associated new weights, in a portfolio database.

20. The at least one non-transitory computer readable storage medium of claim 19, wherein the conviction ranking data for each of the plurality of securities comprises data indicative of a manager's likely conviction level for the security compared to the remaining securities of the plurality of securities.

* * * * *